United States Patent
Yamaguchi

Patent Number: 5,967,940
Date of Patent: Oct. 19, 1999

[54] METHOD AND APPARATUS FOR REDUCING BACKLASH SOUND IN GEAR MECHANISM

[75] Inventor: Katsuhiko Yamaguchi, Toyota, Japan

[73] Assignee: Toyota Jidosha Kabushiki Kaisha, Toyota, Japan

[21] Appl. No.: 09/146,522

[22] Filed: Sep. 3, 1998

[30] Foreign Application Priority Data

Sep. 17, 1997 [JP] Japan .................. 9-272234

[51] Int. Cl.⁶ .............. B60K 6/00; B60L 11/14
[52] U.S. Cl. ............... 477/107; 477/97; 701/111
[58] Field of Search ............ 477/97, 107, 109; 701/108–111

[56] References Cited

U.S. PATENT DOCUMENTS

| | | | |
|---|---|---|---|
| 4,554,900 | 11/1985 | Komoda | 123/418 |
| 4,838,227 | 6/1989 | Abromeit | 123/419 |
| 5,574,646 | 11/1996 | Kawasaki et al. | 701/111 |

FOREIGN PATENT DOCUMENTS

| | | |
|---|---|---|
| 0 645 271 A2 | 3/1995 | European Pat. Off. . |
| 0 819 561 A2 | 1/1998 | European Pat. Off. . |
| 50-030223 | 3/1975 | Japan . |
| 58068541 | 4/1983 | Japan . |
| WO 97/18101 | 5/1997 | WIPO . |

Primary Examiner—Khoi Q. Ta
Attorney, Agent, or Firm—Oliff & Berridge, PLC

[57] ABSTRACT

A backlash sound reducing method utilizes backlash sounds in a planetary gear unit in a hybrid vehicle that occur within predetermined operation ranges when the vehicle is stopped or running. If the output energy of an engine is within a predetermined range, the engine is controlled so that the output energy therefrom becomes a predetermined value. In the aforementioned case, it is also possible to increase the revolution speeds of the gears undergoing backlash. This operation avoids operating the engine within a range where the torque fluctuation is large, thereby reducing the backlash sound. Further, by setting relatively high revolution speeds, the force pressing the gears to each other is increased, so that the occurrence of backlash sounds is controlled.

19 Claims, 15 Drawing Sheets

TO S460

METHOD AND APPARATUS FOR REDUCING BACKLASH SOUND IN GEAR MECHANISM

INCORPORATION BY REFERENCE

The disclosure of Japanese Patent Application No. HEI 9-272234 filed on Sep. 17, 1997 including the specification, drawings and abstract is incorporated herein by reference in its entirety.

BACKGROUND OF THE INVENTION

1. Field of the Invention

The present invention relates to a method for reducing the backlash sound in a gear mechanism, a power output apparatus having such a gear mechanism, and a hybrid vehicle equipped with a power output apparatus. More particularly, the invention relates to a technology for reducing the backlash sound in a power output apparatus that includes an internal combustion engine as a power source, a gear mechanism having at least three shafts, one of which is connected to the output shaft of the internal combustion engine and another one of which is connected to a drive shaft, and an electric motor connected to still another one of the at least three shafts.

2. Description of the Related Art

For highly efficient operation of an internal combustion engine and a remarkable improvement of emissions from the engine, hybrid vehicles have been proposed which are equipped with a power output apparatus that performs power transmission between an electric motor and a drive shaft and/or an internal combustion engine using a planetary gear unit, in addition to the conventional power transmission from the internal combustion engine to the drive shaft. In a typical power output apparatus, the output from the internal combustion engine is distributed to the drive shaft and the electric motor by the planetary gear unit so that energy transmitted to the electric motor is regenerated as electricity and, in another occasion, the power from the internal combustion engine and the power from the electric motor are combined and outputted to the drive shaft by the planetary gear unit. Furthermore, during braking, the electric motor is operated to regenerate electric power, thereby applying a braking force to the drive shaft. The electric power regenerated by the electric motor is stored into a battery or the like, and it is used to operate the electric motor when necessary. Therefore, when it is possible to drive the vehicle only by the electric motor, the internal combustion engine can be stopped. With regard to this type of power output apparatus, a technology has been proposed in which in addition to the electric motor as described above (first electric motor), another electric motor (second electric motor) is connected to the drive shaft side, and the driving and regeneration by the first and second electric motors is controlled so that the vehicle can be driven in various driving modes. For example, these modes may include an assist mode in which the drive shaft is rotated at a low speed and a high torque by using the first electric motor to regenerate electric power and using regenerated electric power to drive the second electric motor, an over-drive mode in which the drive shaft is rotated at a high speed and a low torque by using the second electric motor to regenerate electric power and driving the first electric motor, an accelerating mode in which a high accelerating performance is achieved by driving both electric motors, a braking mode in which at least one of the electric motors is used to regenerate electric power and a braking force corresponding to the regenerative energy is applied to the drive shaft, and the like.

An electrical type torque converter is also proposed in which the output shaft of an internal combustion engine is connected to a shaft of a planetary gear unit, and another shaft of the planetary gear unit is connected to an electric motor. In this type of torque converter, the output shaft of the internal combustion engine is connected to, for example, a ring gear shaft of the planetary gear unit, and a sun gear shaft of the planetary gear unit is connected to the electric motor, and a carrier shaft thereof is connected to the drive shaft or an input shaft of a transmission or speed shift device that is connected to the drive shaft. In this construction, when conduction of electric current through three-phase coils of the electric motor is prevented (no-load condition), the carrier shaft idles without outputting power during operation of the internal combustion engine. If the condition is switched by controlling the drive circuit of the electric motor so that current through the three-phase coils will gradually increase from zero and, therefore, regeneration of electric current is started, a braking force corresponding to the regenerated current occurs on the sun gear so that the drive shaft receives a torque that is, at maximum, $(1+\rho)/\rho$ times the output torque of the internal combustion engine where $\rho$ is the gear ratio of the planetary gear unit.

In a power output apparatus or a torque converter as described above, gear teeth backlash sounds, also called clattering sounds, may be produced in the gear mechanism such as the planetary gear unit and the like. Such backlash sounds occur because there is a small clearance in the mesh between teeth of gears and, therefore, teeth of one of the gears in mesh repeatedly strike and separate from teeth of the other gear at the time of a change of the gear driving force and the like. The gear clearance is designed to be as small as possible. Since elimination of the gear clearance results in tight interlocking between the gears thereby making it impossible for the gears to rotate, a small gear clearance is essential in normal gears. As a measure for preventing the strike and separation between gear teeth, a scissors gear construction is known in which teeth of meshing gears are clamped. In this construction, however, the clamping of teeth becomes a braking force against rotation of the gears, giving rise to a problem of energy loss. Considering that the power output apparatuses as described above are intended to improve the energy efficiency of the entire apparatus, it is difficult or inappropriate to employ a gear mechanism having a design that produces a predetermined energy loss.

SUMMARY OF THE INVENTION

Accordingly, it is an object of the present invention to prevent occurrence of a backlash sound in a gear mechanism connected to the output shaft of an internal combustion engine, without degrading the efficiency of the entire power output apparatus.

According to a first aspect of the invention, there is provided a method for reducing a backlash sound that occurs in a gear mechanism having at least a first shaft, a second shaft and a third shaft, the first shaft being connected to an output shaft of an internal combustion engine provided as a power source, the second shaft being connected to a drive shaft as a load, the third shaft being connected to an electric motor. In the method, presence of a condition for occurrence of a backlash sound between gears of the gear mechanism is detected, and torque transmitted between the gears is set to at least a predetermined value if the presence of the condition is detected.

In this backlash sound reducing method, the presence of the condition for occurrence of a backlash sound is detected.

If the condition for occurrence of a backlash sound is detected, torque transmitted between the gears in the gear mechanism is set to at least a predetermined value. As a result of the setting of the transmitted torque to the predetermined value or greater, teeth of the gear transmitting a power are pressed against teeth of the gear receiving a power transmitted, thereby reducing the backlash sound.

As a gear mechanism wherein a first shaft of at least three shafts is connected to the output shaft of an internal combustion engine provided as a power source, a second shaft is connected to a drive shaft as a load, and a third shaft is connected to an electric motor, various constructions in terms of mechanics are known, including, for example, a planetary gear unit, a bevel gear type actuator unit, and the like. The method of the invention may also be applied to other gear mechanisms as long as the mechanisms have a construction where gears are used for power transmission between at least two shafts of at least three shafts and a clearance is provided between teeth of two gears so that backlash sounds can be produced.

The backlash sound reducing method of the invention may be embodied in various power output apparatuses having different constructions. According to another aspect of the invention, there is provided a power output apparatus including an internal combustion engine provided as a power source, and a gear mechanism having at least a first shaft, a second shaft and a third shaft. An output shaft of the internal combustion engine is connected to the first shaft, a drive shaft is connected to the second shaft, and an electric motor is connected to the third shaft. The apparatus also includes a backlash sound detection device for detecting a condition for occurrence of a backlash sound between gears of the gear mechanism, and an internal combustion engine revolution speed control device for, if the condition is detected, controlling a revolution speed of the internal combustion engine so that the revolution speed becomes equal to or greater than a predetermined value.

In this power output apparatus, if the condition for occurrence of a backlash sound is detected, the revolution speed of the internal combustion engine is controlled so as to become equal to or greater than the predetermined value. Therefore, the force pressing gears in the gear mechanism against each other is increased, thereby reducing the likelihood of the backlash sound, that is, reducing the backlash sound.

This power output apparatus may further include a drive shaft output maintaining device for, if the revolution speed of the internal combustion engine is changed to the predetermined value or greater in order to reduce the occurrence of backlash sounds, canceling out a change in output state of the drive shaft caused by a change in the revolution speed. By providing this device, it becomes possible to maintain an output state of the drive shaft and avoid affecting the load connected to the drive shaft. For example, in a case where the power output apparatus is installed in a vehicle and the drive shaft is connected to the axles, the output state of the drive shaft is maintained even if the revolution speed of the internal combustion engine is changed to the predetermined value or greater in order to reduce the backlash sound. Therefore, the drivability of the vehicle will not be degraded.

In the power output apparatus according to the second aspect of the invention, the gear mechanism may be a planetary gear unit. The planetary gear unit is capable of mechanically distributing and combining power to and from three shafts. If the drive shaft connected to the second shaft is connected to a second electric motor that is separate from the aforementioned electric motor (first electric motor), it becomes possible, by controlling the first and second electric motors, to control the revolution speed of the internal combustion engine so as to become equal to or greater than the predetermined value without changing the output energy of the internal combustion engine. Therefore, the backlash sound can be reduced. In this construction, the energy outputted by the internal combustion engine remains unchanged, so that torque conversion by the power output apparatus or the like will maintain a constant power outputted to the drive shaft, without needing a supply of energy from or to discharge energy to an external device.

The power output apparatus according to the second aspect of the invention may further include an internal combustion engine operation control device for varying an energy outputted by the internal combustion engine. In this construction, it is possible to control the revolution speed so as to become equal to or greater than the predetermined value while changing an output energy of the internal combustion engine by controlling the first and second electric motors and the internal combustion engine operation control device. Although the output energy of the internal combustion engine changes, the amount of change is cancelled out by, for example, the driving or regeneration by the second electric motor connected to the drive shaft. In some manners of use of the power output apparatus, it may be unnecessary to cancel out the amount of change.

According to still another aspect of the invention, there is provided a power output apparatus including an internal combustion engine provided as a power source, and a gear mechanism having at least a first shaft, a second shaft and a third shaft. An output shaft of the internal combustion engine is connected to the first shaft, a drive shaft is connected to the second shaft, and an electric motor is connected to the third shaft. The apparatus also includes a backlash sound detection device for detecting a condition for occurrence of a backlash sound between gears of the gear mechanism, and an internal combustion engine torque control device for, if the condition for occurrence of a backlash sound is detected, controlling an output torque of the internal combustion engine so that the output torque becomes equal to or less than a predetermined value.

In this power output apparatus, if the condition for occurrence of a backlash sound is detected, the output torque of the internal combustion engine is controlled so as to become equal to or less than the predetermined value. Therefore, the torque fluctuation of the internal combustion engine, which is a cause for the backlash, is reduced, thereby reducing the backlash sound.

This power output apparatus may further include a drive shaft output maintaining device for, if the output torque of the internal combustion engine is changed to the predetermined value or less in order to reduce the occurrence of backlash sounds, canceling out a change in output state of the drive shaft caused by a change in the output torque. By providing this device, it becomes possible to maintain an output state of the drive shaft and avoid affecting the load connected to the drive shaft. For example, in a case where the power output apparatus is installed in a vehicle and the drive shaft is connected to the axles, the output state of the drive shaft is maintained even if the output torque of the internal combustion engine is changed to the predetermined value or less in order to reduce the backlash sound. Therefore, the drivability of the vehicle will not be degraded.

In the power output apparatus according to the invention, the gear mechanism may be a planetary gear unit. The planetary gear unit is capable of mechanically distributing and combining power to and from three shafts. If the drive shaft connected to the second shaft is connected to a second electric motor that is separate from the aforementioned electric motor (first electric motor), it becomes possible, by controlling the first and second electric motors, to control the output torque of the internal combustion engine so as to become equal to or less than the predetermined value without changing the output energy of the internal combustion engine. Therefore, the backlash sound can be reduced. In this construction, the energy outputted by the internal combustion engine remains unchanged, so that torque conversion by the power output apparatus or the like will maintain a constant power outputted to the drive shaft, without needing a supply of energy from or to discharge energy to an external device.

The power output apparatus according to the third aspect of the invention may further include an internal combustion engine operation control device for varying an energy outputted by the internal combustion engine. In this construction, it is possible to control the output torque so as to become equal to or less than the predetermined value while changing an output energy of the internal combustion engine by controlling the first and second electric motors and the internal combustion engine operation control device. Although the output energy of the internal combustion engine changes, the amount of change is cancelled out by, for example, the driving or regeneration by the second electric motor connected to the drive shaft. In some manners of use of the power output apparatus, it may be unnecessary to cancel out the amount of change, as in the power output apparatus according to the second aspect of the invention.

In the power output apparatuses as described above, various arrangement may be conceived for the backlash sound detection device for detecting the condition for occurrence of a backlash sound. For example, the condition for occurrence of a backlash sound may be detected, on condition that the operation state of the power output apparatus is within a predetermined operation range. Since the revolution speed or torque range where backlash sound are likely to occur can be specified to some extent beforehand, it is possible to detect the presence of the condition for occurrence of a backlash sound on the basis of the operation state. It is-also possible to design the detection device as an acoustic sensor for detecting occurrence of a backlash sound actually as a sound. In this design, the occurrence of a backlash sound may be detected on the basis of, for example, a sound transmitted through air, or vibrations in the gear mechanism.

It is also possible to detect a predetermined period following a start of the internal combustion engine during which period a vehicle equipped with the power output apparatus has been running, as a backlash sound occurrence period. Furthermore, it is also possible to detect the condition for occurrence of a backlash sound if an output torque of the electric motor is equal to or less than a predetermined value and magnitude of fluctuation of the output torque of the internal combustion engine is equal to or greater than a predetermined value. The later detection design is effective for the following reason. If the output torque of the electric motor is small, cancellation of the fluctuation of the output torque of the internal combustion engine may fail so that a backlash sound can occur.

The power output apparatuses as described above are mainly intended to output power to an external device together with the internal combustion engine provided as a power source. However, the power output apparatus according to the invention may also be applied to an apparatus that mainly functions as a torque converter. In this case, the gear mechanism may be a planetary gear unit. By varying the braking force applied from the electric motor td the corresponding shaft of the planetary gear unit, the torque outputted from the output shaft of the internal combustion engine to the drive shaft can be converted.

Using a power output apparatus as described above, a hybrid vehicle may be constructed. According to a further aspect of the invention, there is provided a hybrid vehicle further including a secondary battery that stores an electric energy regenerated by the electric motor and outputs electric energy to the electric motor when necessary, and an internal combustion engine operation control device for varying an energy outputted by the internal combustion engine. The vehicle also includes a target power setting device for setting a target value of power that needs to be outputted to the drive shaft, and a power control means for controlling a power outputted to the drive shaft so as to become substantially equal to the target value of power by controlling the internal combustion engine operation control means and electric power exchange between the electric motor and the secondary battery on the basis of the target value of power.

In this hybrid vehicle, in order to reduce the backlash sound, the revolution speed of the internal combustion engine is controlled so as to become equal to or greater than the predetermined value, or the output torque of the internal combustion engine is controlled so as to become equal to or less than the predetermined value. Besides this operation, the control for substantially equalizing the power outputted to the drive shaft to the target value of power set by the target power setting device is performed by controlling the internal combustion engine operation control device and electric power exchange between the electric motor and the secondary battery. Therefore, the hybrid vehicle of the invention is able to substantially equalizing the power of the drive shaft to the target power value and reduce the backlash sound in the gear mechanism.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
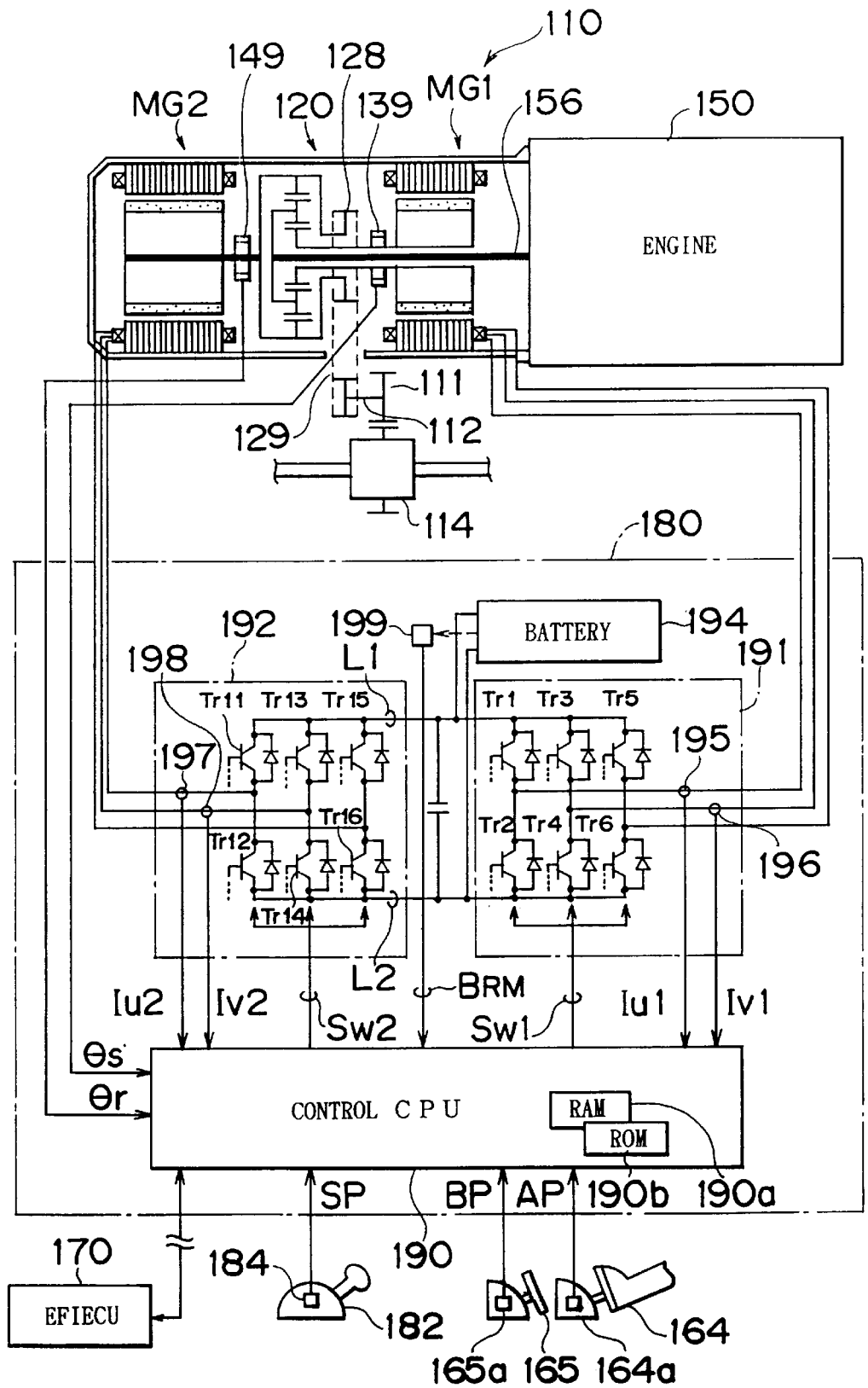
FIG. 1 is a schematic illustration of the construction of a power output apparatus employing a backlash sound reducing method according an embodiment of the invention.
Figure 2:
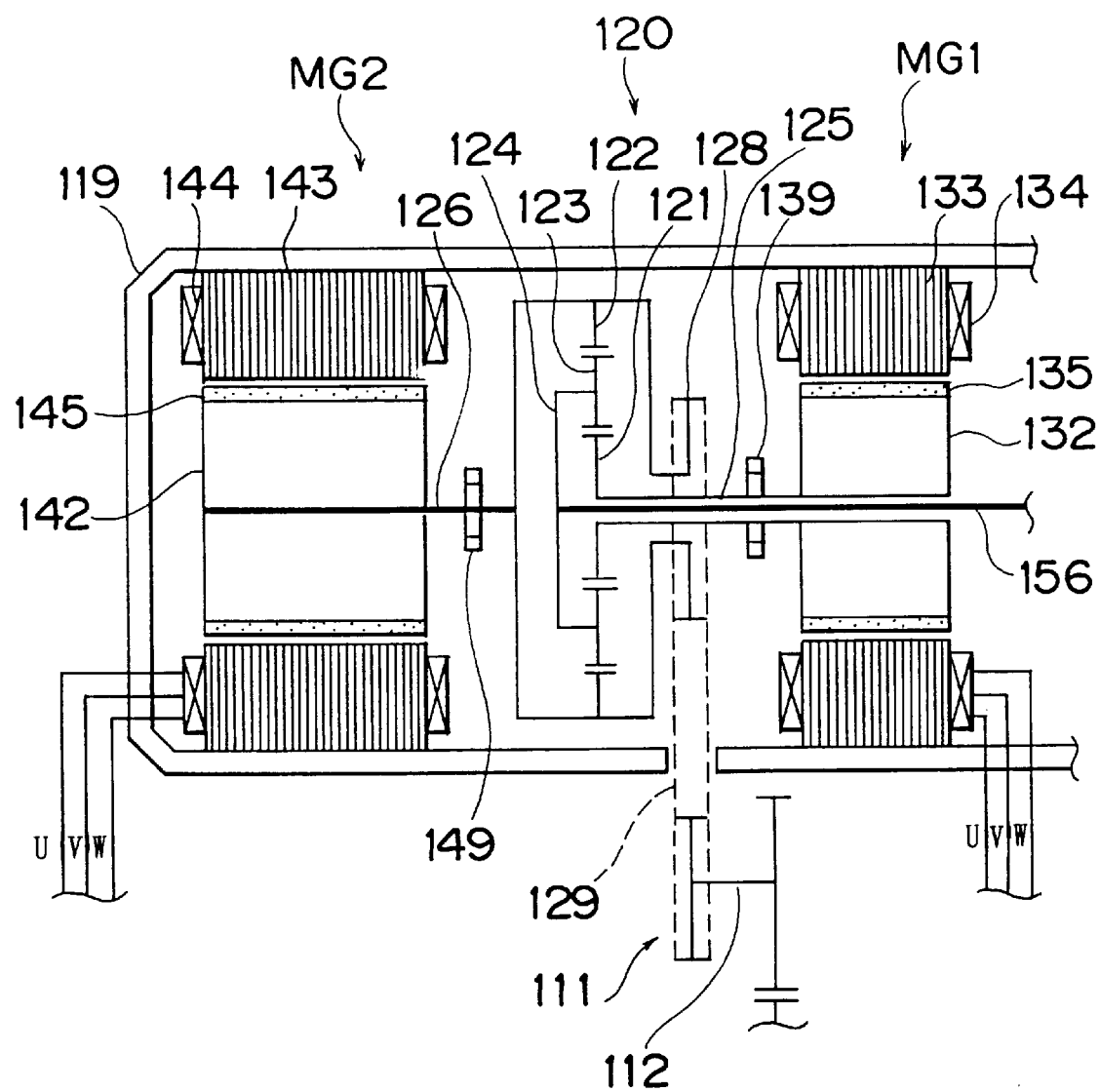
FIG. 2 is a detailed illustration of mechanical portions of the power output apparatus shown in FIG. 1.
Figure 3:
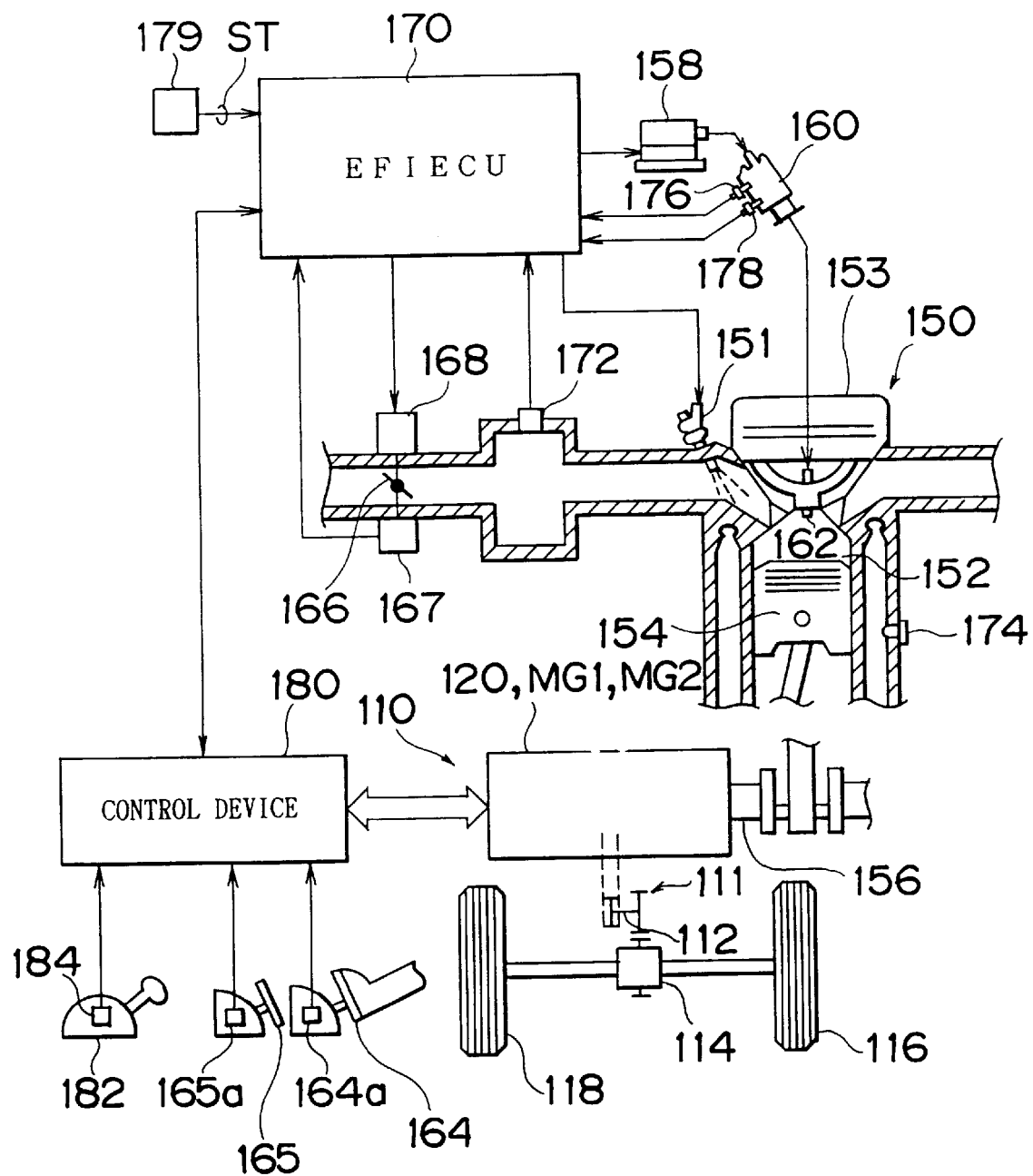
FIG. 3 is an illustration of the construction of a vehicle equipped with the power output apparatus shown in FIG. 1.

FIG. 1 is a schematic illustration of the construction of a power output apparatus 110 according to an embodiment to which the backlash sound reducing method of the invention is applied. FIG. 2 is an enlarged fragmentary view of the power output apparatus 110 of this embodiment. FIG. 3 is a schematic illustration of a vehicle incorporating the power output apparatus 110 of the embodiment.

Referring first to FIG. 3, the vehicle incorporating the power output apparatus 110 has, as a power source, a gasoline engine 150 that is operated by using gasoline. The engine 150 takes into a combustion chamber 152 a mixture of air drawn from an intake system via a throttle valve 166 and gasoline injected from a fuel injection valve 151, and converts the movements of a piston 154 that is thrust down by explosion of the air-fuel mixture into rotational motion of a crankshaft 156. The throttle valve 166 is opened and closed by an actuator 168. The ignition of air-fuel mixture is performed by an electric spark produced by an ignition plug 162 upon a high voltage supplied thereto from an igniter 158 via a distributor 160.

The operation of the engine 150 is controlled by an electronic control unit (hereinafter, referred to as "EFIECU") 170. The EFIECU 170 is connected to various sensors for detecting operating conditions of the engine 150, for example: a throttle valve position sensor 167 for detecting the opening (position) of the throttle valve 166; an intake pipe negative pressure sensor 172 for detecting the negative pressure in the engine 150; a water temperature sensor 174 for detecting the water temperature in the engine 150; a revolution speed sensor 176 and a rotational angle sensor 178 provided for detecting the revolution speed and rotational angle of the crankshaft 156; and the like. The EFIECU 170 is also connected to a starter switch 179 for detecting states ST of an ignition key, and various other sensors, switches, and the like that are not shown in FIG. 3.

Figure 4:
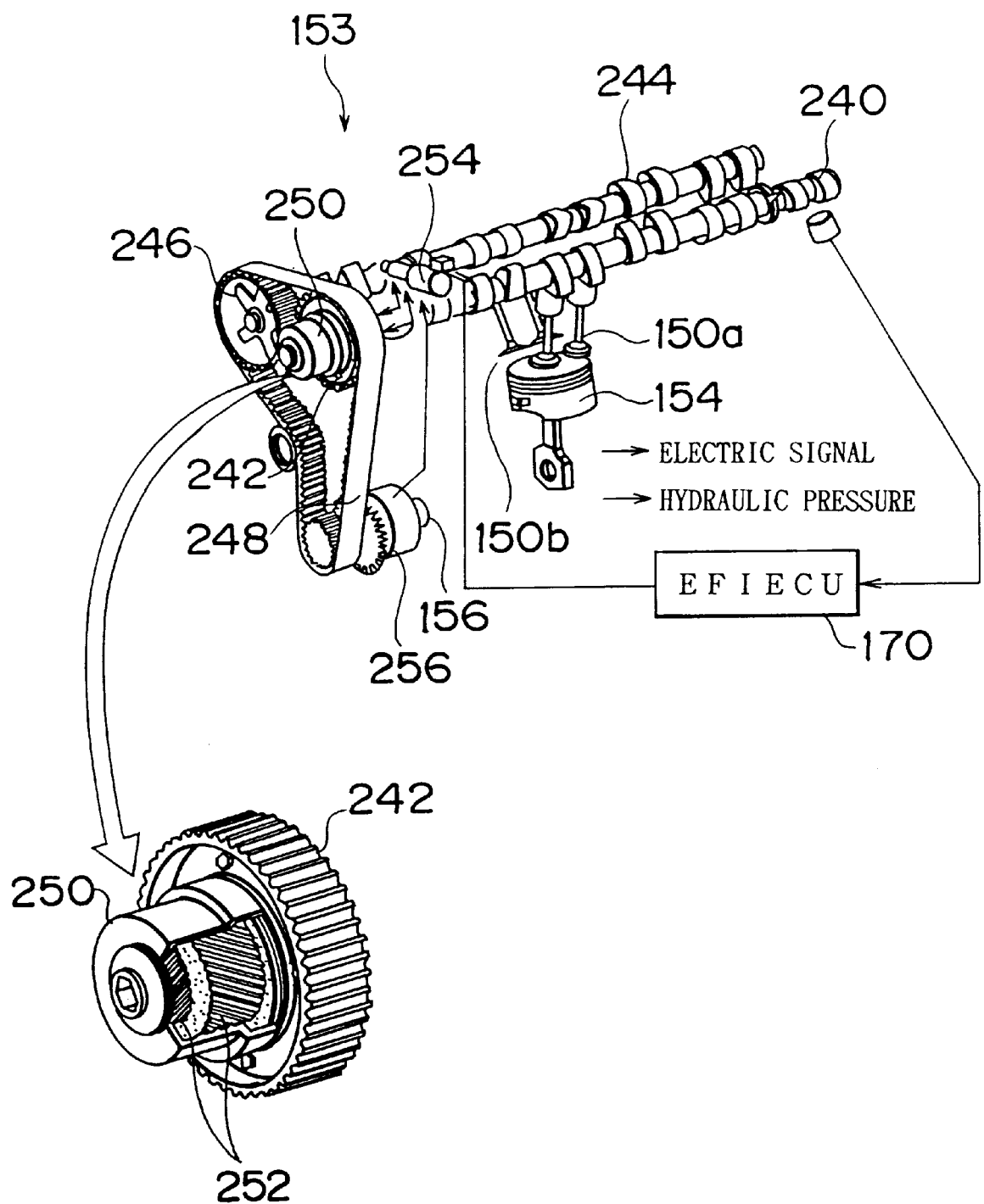
FIG. 4 illustrates the operation principle of a variable valve timing device provided in an engine according to an embodiment of the invention.

The engine 150 is equipped with a variable valve timing device (hereinafter, referred to as "VVT") 153 that varies the timing of opening and closing an intake valve 150a. FIG. 4 is a schematic illustration of the VVT 153. The VVT 153 adjusts the opening and closing timing of the intake valve 150a by advancing and delaying the phase of an intake camshaft 240 that opens and closes the intake valve 150a, relative to the crankshaft angle.

A specific construction of the VVT 153 adopted in this embodiment will be described with reference to FIG. 4. The VVT 153 in this embodiment is capable of continuously varying the valve opening and closing timing. As in a normal construction, the intake valve 150a is opened and closed by a cam mounted on the intake camshaft 240, and an exhaust valve 150b is opened and closed by a cam mounted on an exhaust camshaft 244. An intake camshaft timing gear 242 coupled to the intake camshaft 240 and an exhaust camshaft timing gear 246 coupled to the exhaust camshaft 244 are connected to the crankshaft 156 by a timing belt 248 so that the intake valve 150a and the exhaust valve 150b can be opened and closed at timing in accordance with the revolution speed of the engine 150. In addition to the normal construction, the VVT 153 has a construction wherein the intake camshaft timing gear 242 and the intake camshaft 240 are interconnected by a VVT pulley 250 that is hydraulically operated, as shown in FIG. 4. The VVT pulley 250 has an OCV 254, that is, an input hydraulic pressure control valve. The interior of the VVT pulley 250 is formed by a combination of variable pistons 252 that are movable in the direction of the axis of the VVT pulley 250 by the hydraulic pressure inputted by the OCV 254. The hydraulic pressure inputted to the VVT pulley 250 is supplied thereto by an engine oil pump 256 that is driven by the crankshaft 156.

The principle of the operation of the VVT 153 is as follows. The EFIECU 170 determines valve timing in accordance with the operating conditions of the engine 150, and outputs a control signal for controlling the opening and closing of the OCV 254. In accordance with the control signal, the hydraulic pressure inputted to the VVT pulley 250 is varied and, therefore, the variable pistons 252 are moved in a direction of the axis of the VVT pulley 250. Since the shaft of each variable piston 252 is obliquely threaded, the variable pistons 252 rotate as they are moved in the direction of the axis, so that the mount angle between the intake camshaft 240 and the intake camshaft timing gear 242 interconnected by the variable pistons 252 is changed. In this manner, the opening and closing timing of the exhaust valve 150b and the intake valve 150a can be changed, and the valve overlap can be changed. In this construction, the VVT pulley 250 is provided only on the intake camshaft 240, and not on the exhaust camshaft 244. Therefore, in this construction, the valve overlap is controlled by controlling the timing of the intake valve 150a relative to the timing of the exhaust valve 150b. However, a similar pulley construction can easily be provided for the exhaust valve 150b.

The VVT device may be used for the starting control of the engine 150. At the start of the engine 150, the timing of the intake valve 150a is appropriately adjusted by the EFIECU 170 so as to increase the valve overlap. Therefore, the load due to the work of the engine 150 relative to an electric motor MG1 can be reduced.

Although this embodiment adopts the VVT device, the device for varying the valve overlap is not limited to the VVT device. For example, if the intake valve 150a and the exhaust valve 150b can be hydraulically opened and closed without using cams, it is also possible to vary the valve overlap by controlling the hydraulic valves provided for the intake valve 150a and the exhaust valve 150b.

Next described will be a system wherein power is outputted to drive wheels 116, 118 using the engine 150 as a power source. The crankshaft 156 of the engine 150 is connected to the power output apparatus 110. Basically, the power output apparatus 110 inputs power from the engine 150 via the crankshaft 156, and outputs power to a drive shaft 112 via a power transmission gear 111. Power outputted to the drive shaft 112 is transmitted by a differential gear unit 114 to finally drive the drive wheels 116, 118.

The power output apparatus 110, connected to the crankshaft 156 of the engine 150, is substantially made up of a planetary gear unit 120, the electric motor MG1, and another electric motor MG2, as indicated in FIG. 3. The crankshaft 156 of the engine 150 is mechanically connected to a planetary carrier 124 of the planetary gear unit 120, as shown in FIG. 2. A sun gear 121 is connected to the electric motor MG1, and a ring gear 122 is connected to the electric motor MG2. The power output apparatus 110 has a control device 180 for driving and controlling the electric motors MG1, MG2.

As shown in FIG. 2, the planetary gear unit 120 is substantially made up of the sun gear 121 coupled to a hollow sun gear shaft 125 through which the crankshaft 156 extends along the axis of the sun gear shaft 125, the ring gear 122 coupled to a ring gear shaft 126 that is coaxial with the crankshaft 156, a plurality of planetary pinion gears 123 disposed between the sun gear 121 and the ring gear 122 for revolving movements round the sun gear 121 along with rotating movements, and the planetary carrier 124 connected to the end of the crankshaft 156 and supporting the rotating shaft of each planetary pinion gear 123. The three shafts of the planetary gear unit 120, that is, the sun gear shaft 125, the ring gear shaft 126 and the planetary carrier 124 (the crankshaft 156), serve as power input/output shafts. When the power input/output regarding two of the three shafts is determined, the power input/output regarding the third shaft is determined on the basis of the predetermined power input/output regarding the two shafts. The power input/output regarding the three shafts of the planetary gear unit 120 will be described in detail later.

A power output gear 128 for outputting power from the planetary gear unit 120 is connected to an end of the ring gear 122, the end being closer to the electric motor MG1. The power output gear 128 is connected to the power transmission gear 111 by a chain belt 129 so that power can be transmitted between the power output gear 128 and the power transmission gear 111. As shown in FIG. 1, the power transmission gear 111 is gear-connected to the differential gear unit 114 by the drive shaft 112.

The electric motor MG1 is provided also as a synchronous electric power generator. The electric motor MG1 has a rotor 132 that is provided with a plurality of permanent magnets 135 (four N-pole-exposed and four S-pole-exposed magnets in this embodiment) disposed on an outer peripheral surface of the rotor 132, and a stator 133 provided with winding of three-phase coils 134 that produce rotating magnetic fields. The rotor 132 is coupled to the sun gear shaft 125 coupled to the sun gear 121 in the planetary gear unit 120. The stator 133 is formed by stacking thin plates of non-directional electromagnetic steel, and is fixed to a case 119. The electric motor MG1 operates as a motor wherein the rotor 132 is rotated by interaction between the magnetic fields produced by the permanent magnets 135 and the magnetic fields produced by the three-phase coils 134, and also operates as a power generator wherein an electromotive force is produced across the ends of the three-phase coils 134 by interaction between the magnetic fields produced by the permanent magnets 135 and rotation of the rotor 132. The sun gear shaft 125 is provided with a resolver 139 for detecting the rotational angle θs of the sun gear shaft 125.

The electric motor MG2 is provided also as a synchronous power generator, as in the electric motor MG1. The electric motor MG2 has a rotor 142 that is provided with a plurality of permanent magnets 145 (four N-pole-exposed magnets and four S-pole-exposed magnets in this embodiment) disposed on an outer peripheral surface of the rotor 142, and a stator 143 provided with winding of three-phase coils 144 that produce rotating magnetic fields. The rotor 142 is coupled to the ring gear shaft 126 coupled to the ring gear 122 of the planetary gear unit 120. The stator 143 is formed by stacking thin plates of non-directional electromagnetic steel, and is fixed to the case 119, as in the electric motor MG1. The electric motor MG2 operates as a motor and a power generator substantially in the same manner as in the electric motor MG1. The ring gear shaft 126 is provided with a resolver 149 for detecting the rotational angle θr of the ring gear shaft 126.

As shown in FIG. 1, the control device 180 provided in the power output apparatus 110 has a first drive circuit 191 for driving the electric motor MG1, a second drive circuit 192 for driving the electric motor MG2, a control CPU 190 for controlling the first and second drive circuits 191, 192, and a battery 194 that is formed by a secondary battery. The control CPU 190 contains a work RAM 190a, a ROM 190b storing processing programs, a serial communication port (not shown) for communication with the EFIECU 170, and input and output ports (not shown). Via the input port, the control CPU 190 receives the rotational angle θs of the sun gear shaft 125 from the resolver 139, the rotational angle θr of the ring gear shaft 126 from the resolver 149, an accelerator pedal position AP from an accelerator pedal position sensor 164a, a brake pedal position BP of a brake pedal 165 from a brake pedal position sensor 165a, a shift position SP of a shifter 182 from a shift position sensor 184, electric current values Iu1, Iv1 from two current detectors 195, 196 provided in the first drive circuit 191, electric current values Iu2, Iv2 from two current detectors 197, 198 provided in the second drive circuit 192, a remaining capacity BRM of the battery 194 from a remaining capacity detector 199, and the like. Via the communication port, the control CPU 190 exchanges with the EFIECU 170, information regarding the output energy Pe of the engine 150, the target revolution speed Ne* and target torque Te* of the engine 150, and the like.

The control CPU 190 outputs a control signal SW1 for driving six transistors Tr1–Tr6 which are switching elements provided in the first drive circuit 191, and a control signal SW2 for driving six transistors Tr11–Tr16 which are switching elements provided in the second drive circuit 192. The transistors Tr1–Tr6 in the first drive circuit 191 and the transistors Tr11–Tr16 in the second drive circuit 192 form transistor inverters. The six transistors of each group make three pairs so that one transistor of each pair forms a source and the other forms a sink relative to a pair of electric power lines L1, L2. The connecting points of the pairs of transistors in the first drive circuit 191 are connected to the three-phase coils 134 of the electric motor MG1. The connecting points of the pairs of transistors in the second drive circuit 192 are connected to the three-phase coils 144 of the electric motor MG2. The power lines L1, L2 are connected to the positive terminal and the negative terminal of the battery 194, respectively. Therefore, using the control signals SW1, SW2, the control CPU 190 sequentially controls the proportion of the on-time regarding the individual pairs of transistors Tr1–Tr6 and Tr11–Tr16, so that the current through the three-phase coils 134, 144 are converted into pseudo-sine waves by PWM control. As a result, the three-phase coils 134, 144 produce rotating fields so that the rotors 132, 142 synchronously rotate with the rotating fields.

Figure 5:
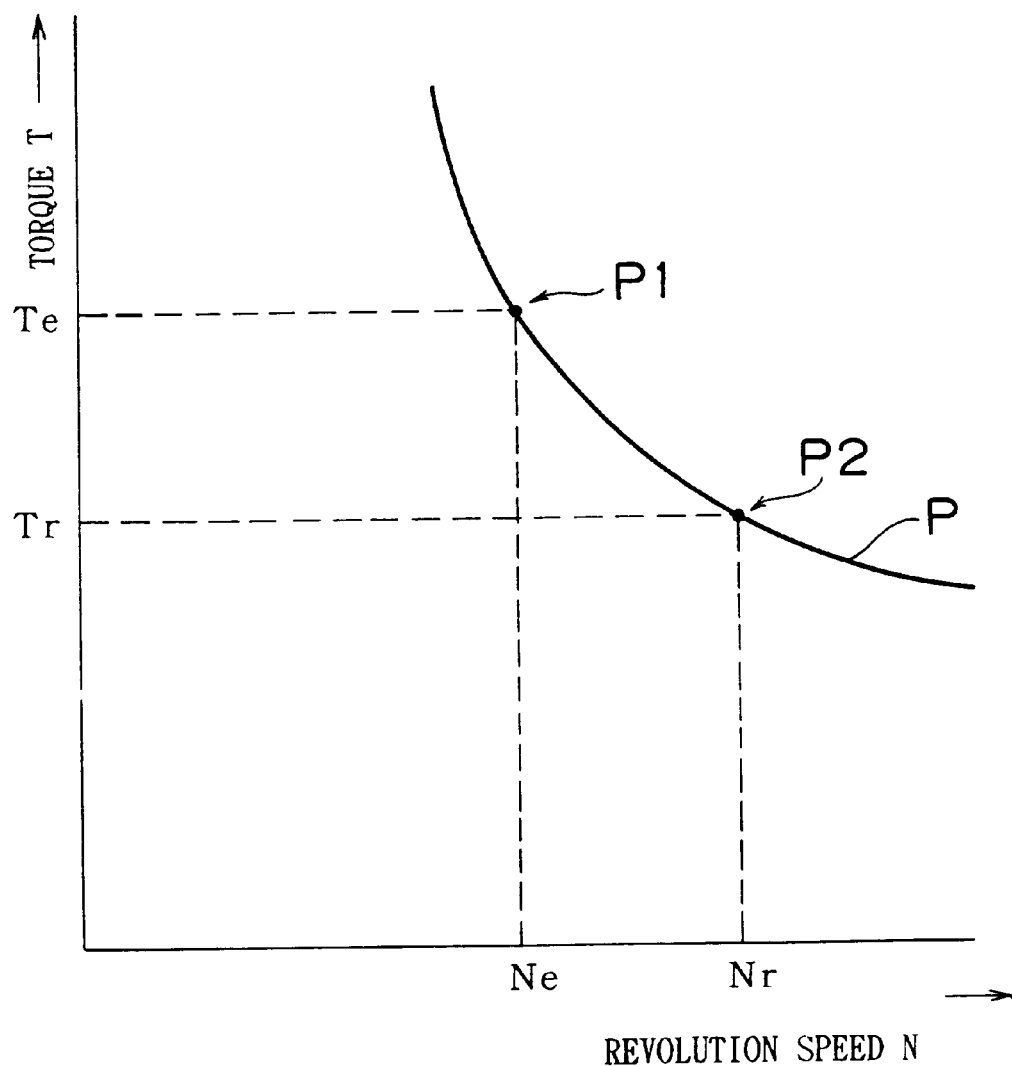
FIG. 5 is a graph indicating the principle of torque conversion by the power output apparatus.

The operation of the power output apparatus 110 of this embodiment will be described. The principle of the operation of the power output apparatus 110, particularly, the torque conversion principle, can be explained as follows. The following discussion will be made in conjunction with a case where the engine 150 is operated at an operating point P1 represented by a revolution speed Ne and a torque Te, and where the ring gear shaft 126 is driven at an operating point P2 that are represented by a revolution speed Nr and a torque Tr different from the revolution speed Ne and the torque Te while the energy Pe outputted from the engine 150 is maintained, that is, a case where the power outputted from the engine 150 is torque-converted and the converted power is applied to the ring gear shaft 126. The relationship between the revolution speed and the torque of the engine 150 and the ring gear shaft 126 is indicated in the graph of FIG. 5.

Figure 6:
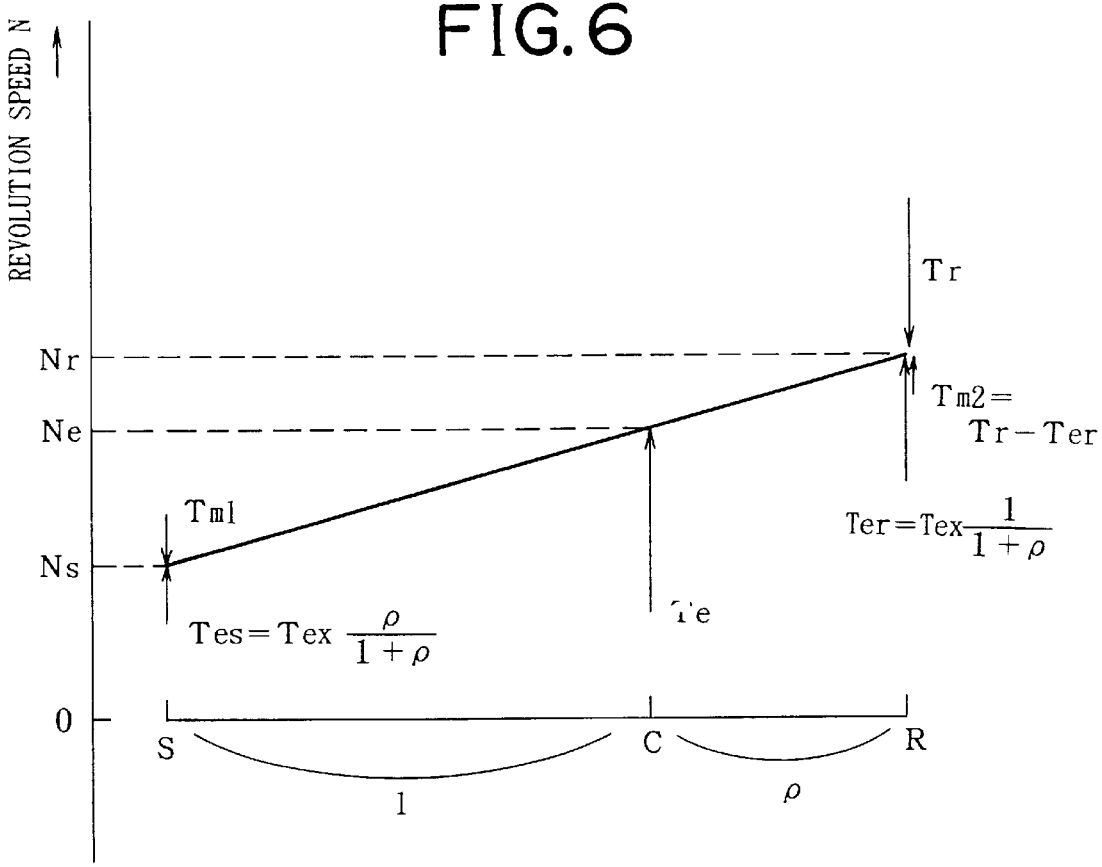
FIG. 6 is an alignment chart indicating an operation state of a planetary gear unit while the vehicle is running.
Figure 7:
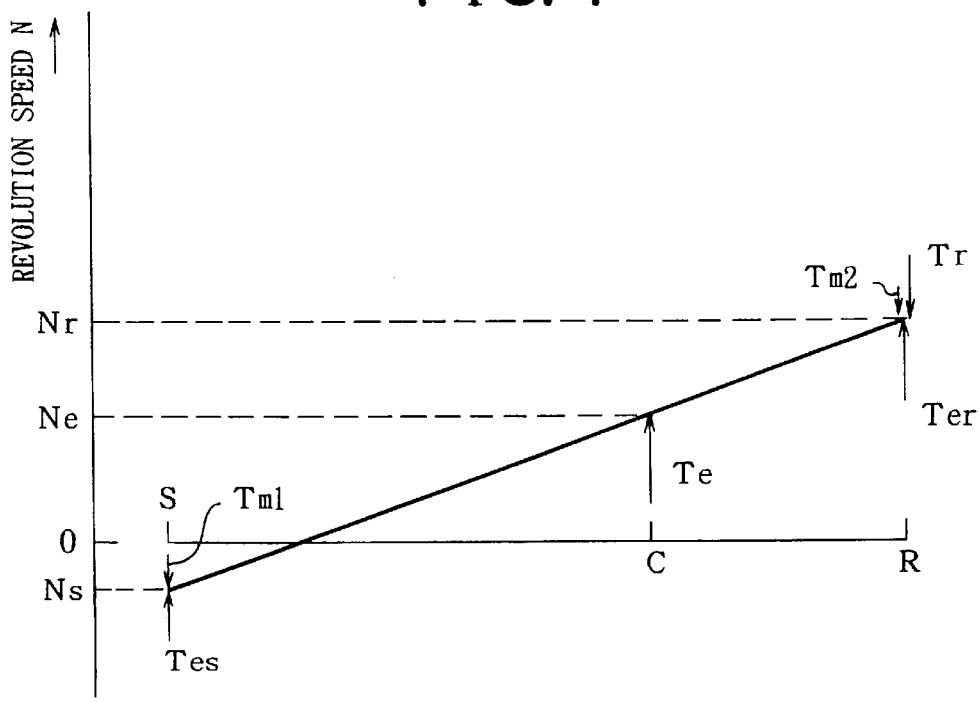
FIG. 7 is another alignment chart indicating another operation state, similar to that shown in FIG. 6.

According to the teachings in mechanics, the relationship between the revolution speed and the torque of the three shafts of the planetary gear unit 120 (the sun gear shaft 125, the ring gear shaft 126 and the planetary carrier 124 (the crankshaft 156)) can be expressed as in diagrams normally termed alignment charts in FIGS. 6 and 7, and therefore can be solved geometrically. The relationship between the revolution speed and the torque of the three shafts of the planetary gear unit 120 can also be solved by, instead of using the alignment charts, using mathematical expressions, for example, by calculating energy with respect to each shaft. However, explanation below according to this embodiment will be made using the alignment charts to facilitate understanding.

The vertical axis in the graph of FIG. 6 indicates the revolution speed of the three shafts, and the horizontal axis indicates the relative position determined by the gear ratio among the three shafts. If the positions S, R of the sun gear shaft 125 and the ring gear shaft 126 are taken at the opposite ends, the position C of the planetary carrier 124 is determined at a point at which the distance between the positions S, R is internally divided at a ratio of 1:ρ, where ρ is the ratio of the number of teeth of the sun gear 121 to the number of teeth of the ring gear 122, and is expressed by expression (1):

$$\rho = \text{(number of sun gear teeth)/(number of ring gear teeth)} \quad (1)$$

Regarding the case where the engine 150 is operated at a revolution speed Ne and the ring gear shaft 126 is driven at a revolution speed Nr (the operating point P1 in FIG. 5), the revolution speed Ne can be plotted on the position C of the planetary carrier 124, coupled to the crankshaft 156 of the engine 150, and the revolution speed Nr can be plotted at the position R of the ring gear shaft 126, in the chart of FIG. 6. The intersection between the straight line drawn so as to pass through the two plotted points (hereinafter referred to as "operation alignment line") and the line of the position S (vertical line) indicates the revolution speed Ns of the sun gear shaft 125. The revolution speed Ns can also be determined by using a proportional calculation expression (2). In this manner, if the revolution speeds of two of the sun gear 121, the ring gear 122 and the planetary carrier 124 in the planetary gear unit 120 are determined, the revolution speed of the other gear is determined on the basis of the predetermined revolution speeds of the two gears.

$$Ns = Nr - (Nr - Ne)1 + \frac{\rho}{\rho} \quad (2)$$

Next, the torque Te of the engine 150 is applied to the drawn operation alignment line at the position C of the planetary carrier 124 in an upward direction as indicated in the chart. That is, relative to the operation alignment line, torque can be expressed as a force (vector) acting on a rigid body. Then, it can be considered that the operation alignment line receives a force corresponding to the engine or motor torque at each of the three positions, so that if the forces are off balance, the operation alignment line moves to a position where balance is established. In other words, in order to achieve balanced operation of the sun gear 121, the ring gear 122 and the planetary carrier 124 at the revolution speeds of, for example, Ns, Nr and Ne, respectively, as indicated in FIG. 6, the torque Te of the engine 150 applied to the operation alignment line at the position C and the torque Tr received from the outside by the ring gear 122 (which results in the torque outputted to drive the vehicle) must balance the torques Tm1, Tm2 of the electric motors MG1, MG2 applied to the operation alignment line at the positions S, R. Since it is possible to divide the torque Te acting on the operation alignment line at the position C into a plurality of forces acting on a rigid body at different positions, the torque Te is divided into a torque Tes at the position S and a torque Ter at the position R on the basis of equations (3) using the gear ratio η. In the explanation below using the operation alignment line, the torques Tes, Te, Ter, Tr are handled as absolute values, assuming that the torque is expressed as a positive value regardless of the direction of the torque. However, the torques Tm1, Tm2, which are determined so as to balance the torques Te and Tr, are handled with positive or negative signs, where the torque Tm1 is positive when directed downward, and the torque Tm2 is positive when directed upward. Consequently, if Tr–Ter>0, then the torque Tm2 is in the upward direction in the alignment chart, and if Tr–Ter<0, then the torque Tm2 is in the downward direction. The direction of the torques Tm1, Tm2 is not related to whether the electric motors MG1, MG2 are regenerating electric power or consuming electric power (driving operation). The state of the electric motors MG1, MG2 (power regeneration or consumption) is determined depending on whether the torque Tm1, Tm2 is acting in such a direction as to increase or reduce the revolution speed of the shaft that is receiving the torque, as explained below.

$$Tes = Te \times \frac{\rho}{1+\rho} \quad (3)$$

$$Ter = Te \times \frac{1}{1+\rho}$$

In order for the operation alignment line to be stable in this condition, it is necessary that force balance be established between the opposite end positions S, R of the operation alignment line. For such balance, a torque Tm1 that is equal in magnitude but opposite in direction to the torque Tes is applied from the electric motor MG1 to the position S, that is, the sun gear 121. In addition, a torque Tm2 equal in magnitude but opposite in direction to a resultant torque of the torque Tr and the torque Ter is applied from the electric motor MG2 to the position R, that is, the ring gear 122. In this case, since the torque Tm1 from the electric motor MG1 acts in such a direction as to reduce the revolution speed of the shaft that receives the torque, the electric motor MG1 operates as a generator. Therefore, the electric motor MG1 regenerates an electric energy Pm1 expressed as the multiplication product of the torque Tm1 and the revolution speed Ns. The regenerated electric energy is conducted through the first drive circuit 191 to the battery 194, and it is temporarily stored therein. The torque Tm2 from the electric motor MG2 acts in such a direction as to increase the revolution speed of the shaft that receives the torque and, therefore, the electric motor MG2 operates as a motor. That is, the electric motor MG2 takes from the battery 194 an electric energy Pm2 expressed as the multiplication product of the torque Tm2 and the revolution speed Nr, and outputs the energy as a driving power to the ring gear shaft 126.

If the electric energy Pm1 and the electric energy Pm2 are equal, the entire electric power consumed by the electric motor MG2 can be provided by regeneration by the electric motor MG1. To this end, the entire energy regenerated needs to be outputted, so that the energy Pe outputted from the engine 150 is made equal to the energy Pr outputted to the ring gear shaft 126. That is, the energy Pe expressed by multiplication product of the torque Te and the revolution speed Ne is made equal to the energy Pr expressed by the multiplication product of the torque Tr and the revolution speed Nr. This can also be stated as follows with reference to the graph of FIG. 5. That is, the power output expressed by the torque Te and the revolution speed Ne of the engine 150 operated at the operating point P1 is torque-converted so that the power that is equal in amount of energy but expressed by the torque Tr and the revolution speed Nr is outputted to the ring gear shaft 126. As described above, the power outputted to the ring gear shaft 126 is transmitted to the drive shaft 112 by the power output gear 128 and the power transmission gear 111, and then transmitted to the drive wheels 116, 118 by the differential gear unit 114. Therefore, a one-to-one relationship is established between the power outputted to the ring gear shaft 126 and the power transmitted to the drive shafts 116, 118. Consequently, the power transmitted to the drive wheels 116, 118 can be controlled by controlling the power outputted to the ring gear shaft 126.

Although in the alignment chart shown in FIG. 6, the revolution speed Ns of the sun gear shaft 125 is positive, the revolution speed Ns of the sun gear shaft 125 can become negative as indicated in the alignment chart of FIG. 7, depending on the revolution speed Ne of the engine 150 and the revolution speed Nr of the ring gear shaft 126. In such a case, the torque Tm1 acts at the position S in such a direction as to increase the revolution speed (absolute value) and, therefore, the electric motor MG1 operates as a motor, consuming an electric energy Pm1 expressed by the multiplication product of the torque Tm1 and the revolution speed Ns. On the other hand, the torque Tm2 of the electric motor MG2 acts in such a direction as to reduce the revolution speed of the shaft that receives the torque. Therefore, the electric motor MG2 operates as a generator, regenerating an electric energy Pm2 expressed by the multiplication product of the torque Tm2 and the revolution speed Nr from the kinetic energy of the ring gear shaft 126. In this case, if the electric energy Pm1 consumed by the electric motor MG1 and the electric energy Pm2 regenerated by the electric motor MG2 are made equal to each other, it becomes possible to provide the exact amount of electric energy Pm1 consumed by the electric motor MG1 through the regeneration by the electric motor MG2.

As can be understood from the foregoing explanation, the power output apparatus 110 is able to torque-convert the entire power inputted from the engine 150 and output the entire torque-converted power to the ring gear shaft 126, regardless of the revolution speed Nr of the ring gear shaft 126. This means that if the efficiency of the torque conversion by the planetary gear unit 120, the electric motor MG1 and the electric motor MG2 is 100%, the operating point of the engine 150 may be any operating point as long as the energy outputted at the operating point is equal to the energy Pr that needs to be outputted to the ring gear shaft 126. Therefore, the operating point of the engine 150 can be freely determined regardless of the revolution speed Nr of the ring gear shaft 126, on condition that the energy outputted at the determined operating point is equal to the energy that needs to be outputted to the ring gear shaft 126.

Above described is the principle of the operation of the power output apparatus 110 in the case where the torque conversion is performed. In addition to the operation in which the entire power from the engine 150 is torque-converted and outputted to the ring gear shaft 126, the power output apparatus 110 can perform other operations, for example: an operation in which a power greater than the power needed for the ring gear shaft 126 (product of the torque Tr and the revolution speed Nr) is inputted from the engine 150 (product of the torque Te and the revolution speed Ne) and the surplus energy is regenerated into electric energy, thereby charging the battery 194; and an operation in which a power greater than the power from the engine 150 is outputted to the ring gear shaft 126 by adding energy from the battery 194. Furthermore, it is also possible to operate the engine 150 during a stop of the vehicle, regenerate the energy from the engine 150 by using the electric motor MG1 and store the regenerated energy into the battery 194. During this operation, the revolution speed of the drive shaft 112 is zero and, therefore, the revolution speed of the electric motor MG2 is also zero. However, during this operation, because control is performed such that the electric motor MG2 is maintained in a locked state and revolution from the engine 150 is directly transmitted to the sun gear shaft 125, the electric motor MG2 receives reaction torque from the engine 150.

In the power output apparatus 110 of this embodiment, the operating point of the engine 150 and the operating point of the ring gear shaft 126 can be set independently of each other although it is necessary to consider the operation of the planetary gear unit 120, as described above. Therefore, within a range where electric power can freely be extracted from and stored into the battery 194, the power output apparatus 110 is able to control the output torque independently of the operating state of the engine 150. Prior to describing a method for reducing the backlash sound in the planetary gear unit 120 according to the invention and the construction of a power output apparatus employing the method, it should be appropriate to describe the torque control in the power output apparatus 110 and the control of the electric motors MG1, MG2 that is performed together with the torque control.

Figure 8:
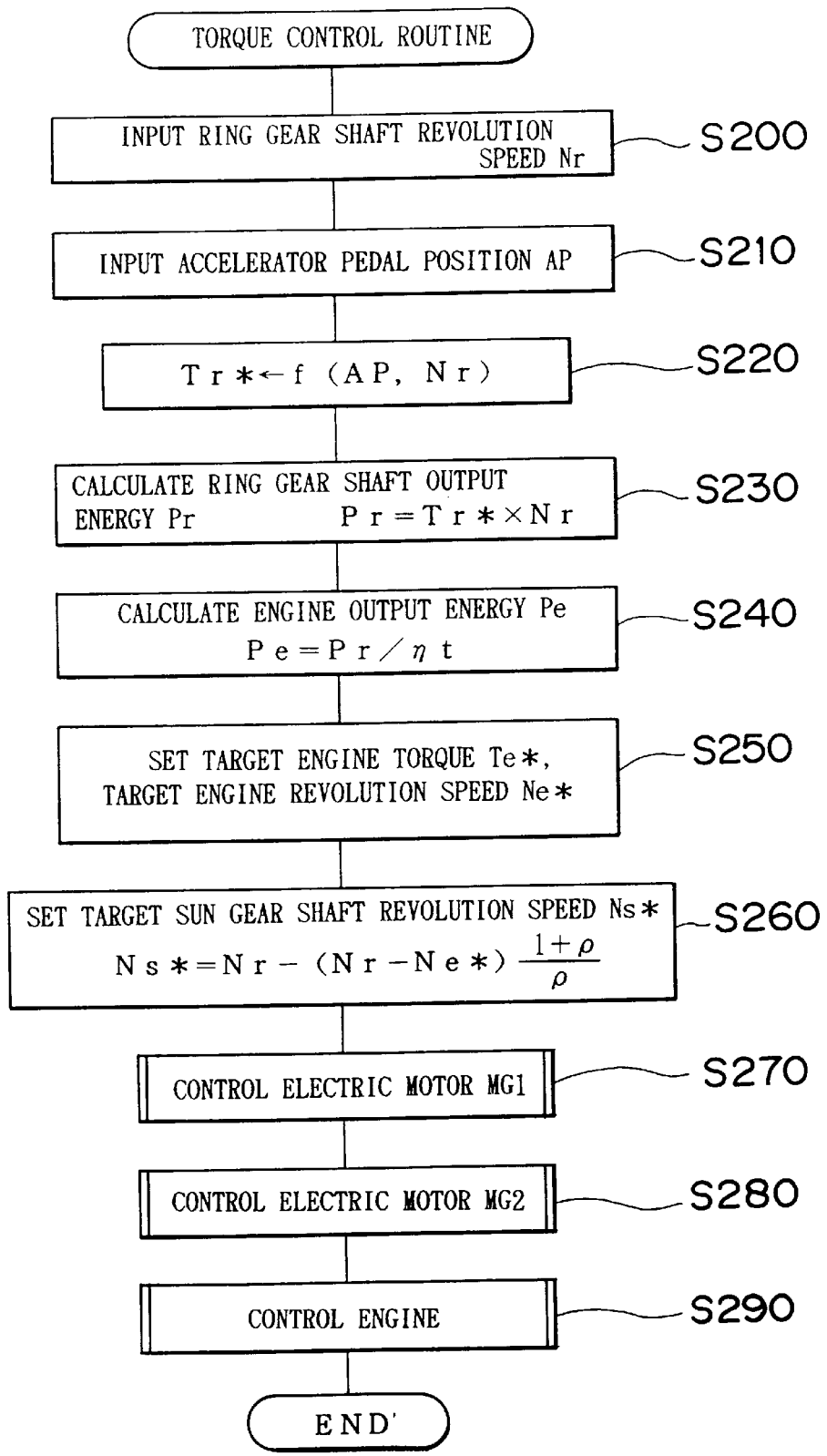
FIG. 8 is a flowchart illustrating a torque control routine executed by the power output apparatus while the vehicle is running.

FIG. 8 is a flowchart illustrating an example of the torque control routine executed by the power output apparatus 110 of the embodiment. When the torque control routine in FIG. 8 is started, the revolution speed Nr of the ring gear shaft 126 is inputted in step S200. The revolution speed Nr of the ring gear shaft 126 can be determined on the basis of the rotational angle θr of the ring gear shaft 126 read in from the resolver 149. Subsequently in step S210, the accelerator pedal position AP is inputted. In step S220, a target torque Tr* to be outputted to the ring gear shaft 126 is determined on the basis of the revolution speed Nr of the ring gear shaft 126 and the accelerator pedal position AP. Since the accelerator pedal 164 is depressed by a driving person when the driver desires more output torque, the value of the accelerator pedal position AP corresponds to the output torque desired by the driver (that is, the required torque for the ring gear shaft 126).

In this embodiment, a map that indicates the relationship among an instruction torque value Tr*, the revolution speed Nr of the ring gear shaft 126 and the accelerator pedal position AP is pre-stored in the ROM 190b. When the accelerator pedal position AP is read in, the corresponding target torque Tr* on the basis of the accelerator pedal position AP and the revolution speed Nd of the drive shaft 112 is extracted.

After the torque Tr* is determined in step S220, the energy Pr that needs to be outputted to the ring gear shaft 126 and therefore to the drive shaft 112 is determined as the multiplication product of the torque Tr* and the revolution speed Nr in step S230. Subsequently in step S240, the energy Pe that needs to be outputted from the engine 150 is calculated from the energy Pr to be outputted to the drive shaft 112. If the energy Pe from the engine 150 is directly outputted to the drive shaft 112 while being torque-converted, the output energy Pe of the engine 150 is determined by dividing the energy Pr to be outputted to the drive shaft 112 by the transmission efficiency ηt (Pe=Pr=Pr/ηr).

After the energy Pe that needs to be outputted from the engine 150 is determined in step S240, the target torque Te* and the target revolution speed Ne* of the engine 150 are set on the basis of the energy Pe to be outputted from the engine 150 in step S250. Since the energy Pe to be outputted from the engine 150, the target revolution speed Ne* and the target torque Te* need merely to have a relationship of Pe=Ne*=Te*, various combinations of the target revolution speed Ne* and the target torque Te* satisfy the relational expression. In this embodiment, a target torque Te* and a target revolution speed Ne* of the engine 150 at which the engine 150 operates with as high efficiency as possible and the operating state of the engine 150 smoothly changes in response to a change in the energy Pe are determined corresponding to the energy Pe through experiments. Such combinations of target torque Te* and revolution speed Ne* are pre-stored in the form of a map in the ROM 190b. After the energy Pe required for the engine 150 is calculated, a target torque Te* and a target revolution speed Ne* of the engine 150 corresponding to the calculated energy Pe are extracted from the map stored in the ROM 190b. The actual control of the engine 150 is performed by the EFIECU 170. The control device 180 constantly outputs to the EFIECU 170, via the communication line, the information about the energy Pe to be outputted from the engine 150 and the revolution speed Ne* needed to achieve the energy Pe. The EFECU 170 receives the information from the control device 180 and controls the operating point of the engine 150 through a control routine (not illustrated).

The target torque Te* and the revolution speed Ne* of the engine can be determined in the manner described above, in view of the energy balance and the operating efficiency of the engine 150. In this embodiment, the output energy Pe and the revolution speed Ne* of the engine 150 and the like are adjusted in order to reduce the backlash sound in the planetary gear unit 120. This adjusting operation will be described in detail later.

The operation illustrated in FIG. 8 will be further described. After the energy Pe that needs to be outputted from the engine 150 is determined in step S240 and the target torque Te* and the target revolution speed Ne* of the engine 150 are determined in step S250, a target revolution speed Ns* of the sun gear shaft 125 is calculated from the target revolution speed Ne* of the engine 150 using equation (2) in step S260. Subsequently, using the target revolution speed Ne* and the target torques Tr*, Te*, the electric motor MG1 and the electric motor MG2 are controlled in steps S270 and S280, respectively. Subsequently in step S290, the engine 150 is controlled. In the control of the engine 150, the amount of intake air, the amount of fuel to be injected and the valve timing are controlled so that the energy determined as the multiplication product of the revolution speed Ne* and the target torque Te* is outputted from the engine 150. The control of the engine 150 is actually performed by the EFIECU 170.

Figure 9:
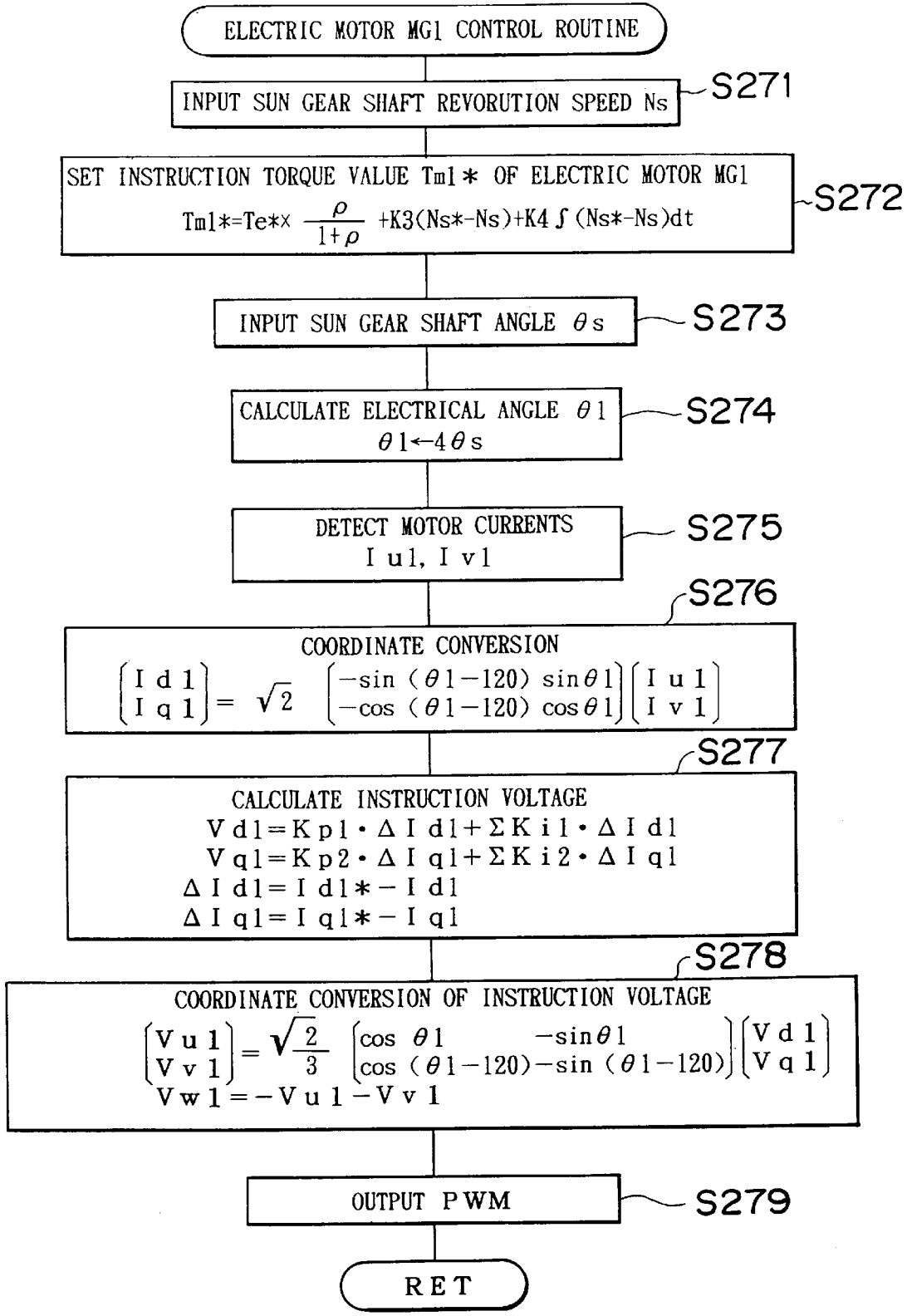
FIG. 9 is a flowchart illustrating a control routine for a first electric motor that is a part of the torque control routine illustrated in FIG. 8.

The control of the electric motor MG1 and the electric motor MG2 will next be described. The control of the electric motor MG1 (step S270 in FIG. 8) is illustrated in detail in FIG. 9. The flowchart of FIG. 9 illustrates an example of the routine of controlling the electric motor MG1. When this routine is started, the control CPU 190 of the control device 180 first reads in the revolution speed Ns of the sun gear shaft 125 in step S271. The revolution speed Ns of the sun gear shaft 125 can be determined from the rotational angle θs of the sun gear shaft 125 detected by the resolver 139 attached to the sun gear shaft 125. Subsequently in step S272, the control CPU 190 sets, as an instruction torque value Tm1* of the electric motor MG1, the value obtained by calculation of equation (4) below based on the read-in revolution speed Ns and the target revolution speed Ns* of the sun gear shaft 125. In equation (4): the first term on the right side is obtained on the basis of balance of the operation alignment line in the alignment charts of FIGS. 6 and 7; the second term on the right side is a proportional term that cancels out the deviation of the revolution speed Ns from the target revolution speed Ns*; and the third term on the right side is an integration term for eliminating the steady deviation. Therefore, the instruction torque value Tm1 * of the electric motor MG1 is set as a value determined on the basis of the balance relationship of the operation alignment line in a steady state (where the deviation of the revolution speed Ns from the target revolution speed Ns* is 0). In equation (4), K3 and K4 are proportional constants. Since the revolution speed Ns of the sun gear shaft 125 is determined by the revolution speed Nr of the ring gear shaft 126 and the revolution speed Ne of the engine 150 as indicated in equation (2), it is possible to stabilize the operation of the engine 150 at the operating point of the target revolution speed Ne* by setting the instruction torque value Tm1 * of the electric motor MG1 on the basis of the revolution speed Ns of the sun gear shaft 125.

$$Tm1^* = Te^* \times \frac{\rho}{1+\rho} + K3(Ns^* - Ns) + K4 \int (Ns^* - Ns)dt \quad (4)$$

After setting the instruction torque value Tm1* of the electric motor MG1, the control CPU 190 detects the rotational angle θs of the sun gear shaft 125 using the resolver 139 in step S273. Subsequently in step S274, the electrical angle θ1 of the electric motor MG1 is determined from the rotational angle θs of the sun gear shaft 125. In this embodiment, since the electric motor MG1 is a synchronous motor having four pole pairs, the electrical angle θ1 is calculated as θ1=4θs. In step S275, the control CPU 190 detects the phase currents Iu1, Iv1 of the electric motor MG1 using the current detectors 195, 196. In step S276, the control CPU 190 performs coordinate conversion from three phases to two phases based on the current values Iu1, Iv1. This coordinate conversion is to convert the electric currents through the three-phase coils into current values along the d-axis and q-axis of a permanent magnet-type synchronous motor, and is equivalent to calculation of equation (5) below. The coordinate conversion is performed in step S276 because in a permanent magnet-type synchronous motor, the d-axis and q-axis currents are essential quantities in controlling torque. However, it is also possible to perform the control while maintaining the three phases.

$$\begin{pmatrix} Id1 \\ Iq1 \end{pmatrix} = \sqrt{2} \begin{pmatrix} -\sin(\theta 1 - 120) & \sin\theta 1 \\ -\cos(\theta 1 - 120) & \cos\theta 1 \end{pmatrix} \begin{pmatrix} Iu1 \\ Iv1 \end{pmatrix} \quad (5)$$

After the conversion to the d-axis and q-axis current values, the control CPU 190 determines differences between the instruction current values Id1*, Iq1* along the axes determined from the instruction torque value Tm1* of the electric motor MG1 and the currents Id1, Iq1 actually flowing along the axes, respectively, and then determines instruction voltage values Vd1, Vq1 along the axes in step S277. In this step, calculation of equations (6) below is performed, and then calculation of equations (7) below is performed. In equations (7), Kp1, Kp2, Ki1, Ki2 are coefficients that have been adjusted so as to match the characteristics of the motor to which the embodiment is applied. The instruction voltage values Vd1, Vq1 are determined by a portion proportional to the deviation ΔI of the current I from the instruction current value I* (the first term on the right side) and accumulation of the past i number of deviations ΔI (the second term on the right side).

$$\Delta Id1 = Id1^* - Id1 \quad (6)$$
$$\Delta Iq1 = Iq1^* - Iq1$$

$$Vd1 = Kp1 \times \Delta Id1 + \sum Ki1 \times \Delta Id1 \quad (7)$$
$$Vq1 = Kp2 \times \Delta Iq1 + \sum Ki2 \times \Delta Iq1$$

Subsequently in step S278, the control CPU 190 performs coordinate conversion (from two phases to three phases) of the voltage instruction values determined in step S277. The coordinate conversion corresponds to the inverse conversion of the three phase-to-two phase conversion performed in step S276. The control CPU 190 thereby determines voltages Vu1, Vv1, Vw1 that are to be actually applied to the three-phase coils 134. The voltages are determined by the following equation (8).

$$\begin{pmatrix} Vu1 \\ Vv1 \end{pmatrix} = \sqrt{\frac{2}{3}} \begin{pmatrix} \cos\theta 1 & -\sin\theta 1 \\ \cos(\theta 1 - 120) & -\sin(\theta 1 - 120) \end{pmatrix} \begin{pmatrix} Vd1 \\ Vq1 \end{pmatrix} \quad (8)$$

The actual voltage control is performed on the basis of the on-off time of the transistors Tr1–Tr6 in the first drive circuit 191. That is, in step S279, the on-time of each of the transistors Tr1–Tr6 is PWM-controlled so that the voltage instruction values are those determined by equation (8).

Figure 10:
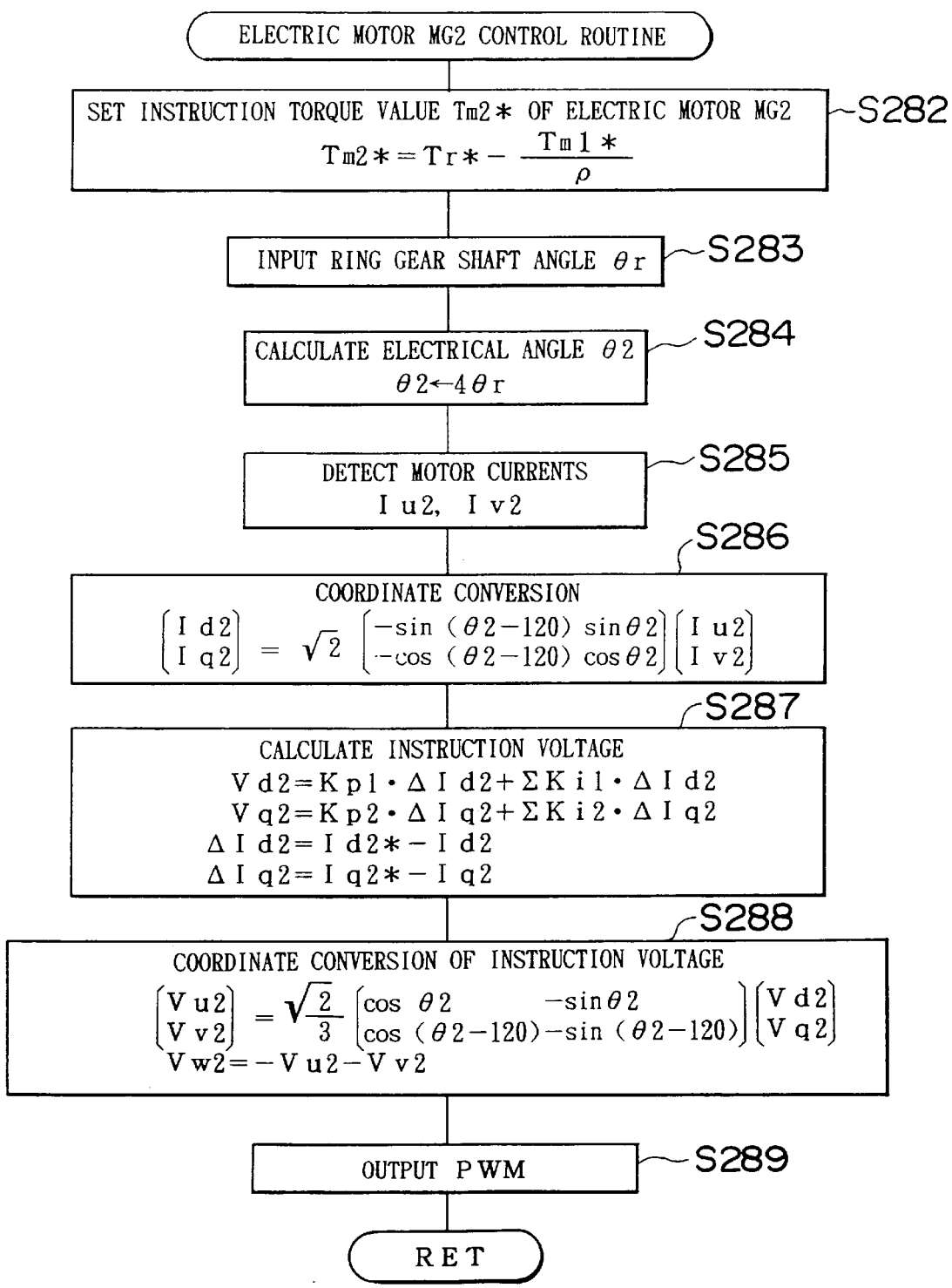
FIG. 10 is a flowchart illustrating a control routine for a second electric motor.

The control of the electric motor MG2 (step S280 in FIG. 8) is performed in a control routine of the electric motor MG2 that is illustrated as an example in FIG. 10. When this routine is started, the control CPU 190 of the control device 180 sets an instruction torque value Tm2* of the electric motor MG2 based on equation (9) in step S282. Equation (9) can be obtained from balance of the operation alignment line in the alignment charts of FIGS. 6 and 7.

$$Tm2^* = Tr^* - \frac{Tm1^*}{\rho} \quad (9)$$

Subsequently, the control CPU 190 inputs the angle θr of the ring gear shaft 126 in step S283, and calculates an electrical angle θ2 of the electric motor MG2 based on the angle θr of the ring gear shaft 126 in step S284, as in the control of the electric motor MG1 (FIG. 9). After that, the control CPU 190 detects motor currents Iu2, Iv2 in step S285, performs three phase-to-two phase coordinate conversion in step S286, calculates instruction voltage values Vd2, Vq2 in step S287, performs two phase-to-three phase coordinate conversion of the instruction voltage values Vd2, Vq2 in step S288, and performs PWM control using the determined instruction voltage values in step S289, as in the control of the electric motor MG1. The operations in these steps are substantially the same as in the control of the electric motor MG1, and will not be described again.

Through these control operations, the power output apparatus 110 of this embodiment operates the engine 150 at high-efficiency operation points, and causes the engine 150 to output an energy matching the power that needs to be outputted to the drive shaft 112 in accordance with the amount of depression of the accelerator pedal 164, and performs torque conversion of the energy into a desired power, and outputs the power to the ring gear shaft 126 and therefore to the drive wheels 116, 118.

Figure 11:
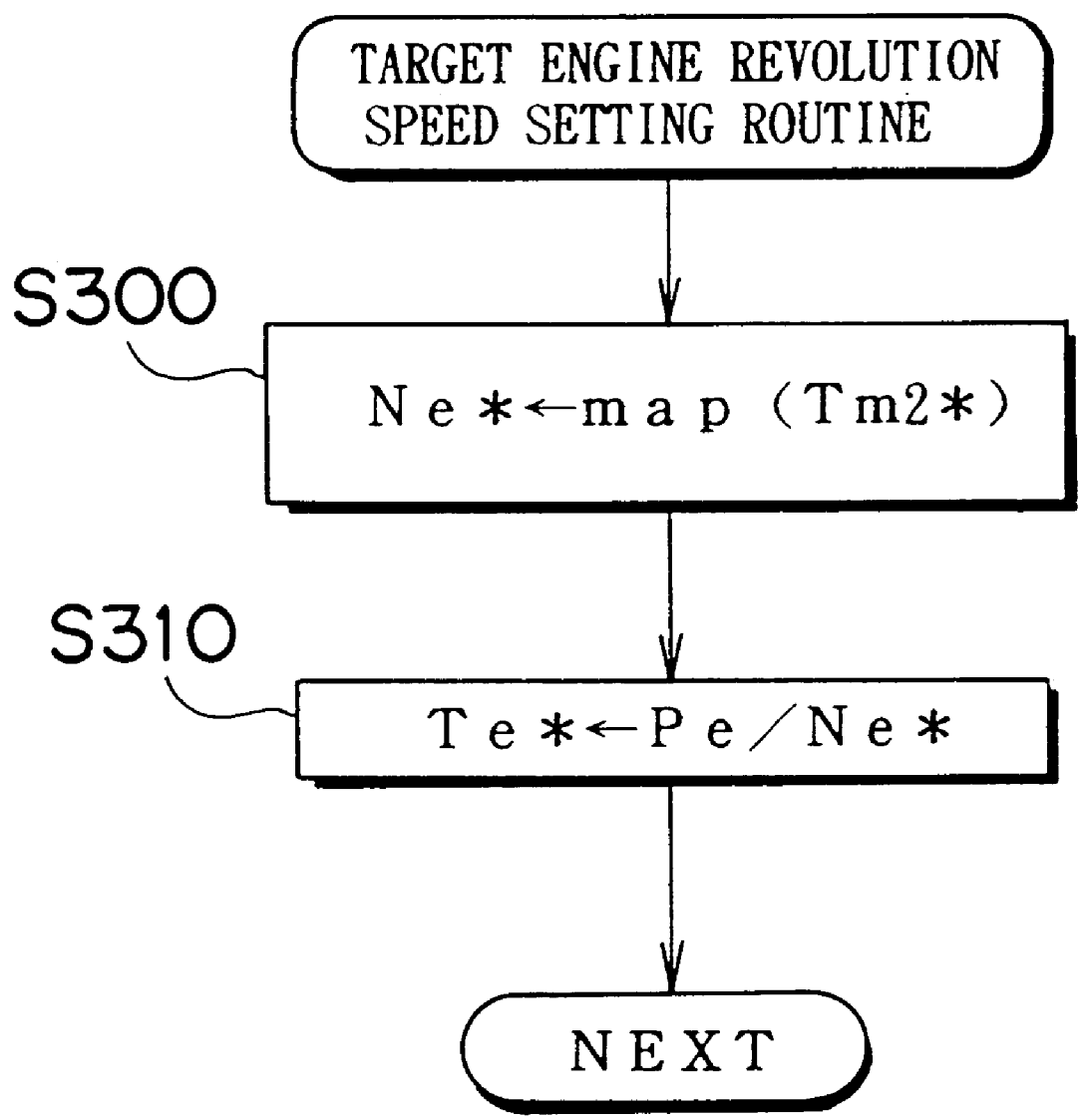
FIG. 11 is a flowchart illustrating a target engine revolution speed setting routine for reducing the backlash sound according to a first embodiment.

Based on the construction and operation of the power output apparatus 110 and, particularly, the construction of the planetary gear unit 120, the manner of control of the engine 150, the electric motor MG1 and the electric motor MG2 as described above, this embodiment employs a backlash sound reducing method as described below in order to reduce the backlash sound in the planetary gear unit 120. The backlash sound reducing method of the first embodiment reduces the backlash sound occurring during the running of the vehicle, as illustrated in the flowchart of FIG. 11.

Figure 12:
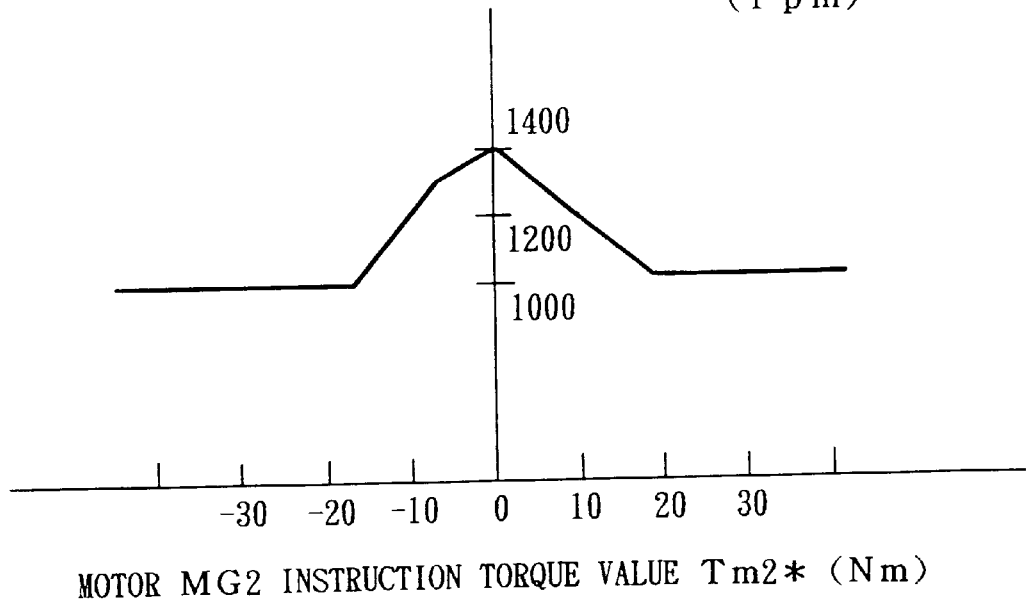
FIG. 12 is a graph indicating an example of the relationship between the instruction torque value for the second electric motor and the target engine revolution speed according to the first embodiment.

In the first embodiment, the backlash sound is reduced by correcting the target revolution speed Ne of the engine 150. More specifically, the processing of step S250 in FIG. 8 of determining the target torque Te* and the target revolution speed Ne* of the engine 150 is performed in the routine illustrated in FIG. 11. In this routine, the target revolution speed Ne* of the engine 150 is determined from a map that is prepared in the ROM 190b beforehand, on the basis of the instruction torque value Tm2* of the electric motor MG2 in step S300. FIG. 12 indicates an example of the map for determining the target revolution speed Ne* of the engine 150 on the basis of the instruction torque value Tm2* of the electric motor MG2. As described above, the engine 150 is operated at a most efficient operating point during normal running of the vehicle. In this embodiment, the engine 150 is normally operated at a revolution speed of 1000 rpm. However, in a case where the instruction torque value Tm2* of the electric motor MG2 is within the range of −20 Nm to 20 Nm, the target revolution speed Ne* of the engine 150 is increased to 1400 rpm at the maximum, as indicated in FIG. 12. An arrangement for determining whether the instruction torque value Tm2* of the electric motor MG2 is within the range of −20 Nm to 20 Nm corresponds to a backlash sound detection device for detecting a condition for occurrence of a backlash sound. In addition, an arrangement for increasing the target revolution speed Ne* of the engine 150 corresponds to an internal combustion engine revolution speed control device for achieving an engine revolution speed equal to or higher than a predetermined value.

After the target revolution speed Ne* is determined in this manner, a target torque Te* is determined by dividing the output energy Pe by the target revolution speed Ne* in step S310. If the running condition remains the same, the energy Pe required for the engine 150 remains unchanged. Therefore, in this embodiment, a constant output energy from the engine 150 and, therefore, a constant power for driving the drive shaft 112, is maintained even if the revolution speed of the engine 150 is increased. The arrangement for this operation corresponds to a drive shaft output maintaining device that cancels out a change in the state of the output of the drive shaft.

The force received by each shaft of the planetary gear unit 120 during the running of the vehicle is indicated as examples in FIGS. 6 and 7. If the instruction torque value Tm2* of the electric motor MG2 is within the range of −20 Nm to 20 Nm, it means that the deviation of the distributed torque Ter (based on the output torque Te of the engine 150) from the torque Tr (that needs to be outputted to the ring gear shaft 126) is within a range where the deviation is relatively small in comparison with the fluctuation of the torque of the engine 150 and, therefore, the torque fluctuation of the engine 150 cannot be cancelled out by using the electric motor MG2. This may be explained using the alignment chart of FIG. 6 as follows. If the torque Te of the engine 150 fluctuates, the operation alignment line behaves as if it oscillates with the position of the sun gear shaft 125 being a fulcrum. That is, the torque fluctuation of the engine 150 is directly reflected in the distributed torque Ter at the position R of the ring gear shaft 126, as fluctuation of the revolution speed of the ring gear shaft 126. Since the feedback control is performed so that the revolution speed Nr of the ring gear shaft 126 becomes equal to the target value Nr*, the fluctuation of the output torque of the engine 150 causes corresponding changes in the torque Tm2 of the electric motor MG2 so as to establish a balance. If the torque of the electric motor MG2 is varied exactly following the torque fluctuation of the engine 150, the operation alignment line remains still. However, since the instruction torque value Tm2* of the electric motor MG2 is relatively small, and since the electric motor MG2 is controlled by feedback control, and since a delay inevitably occurs in control, it is impossible to eliminate the torque fluctuation of the engine 150 through the control of the electric motor MG2. Therefore, the operation alignment line inevitably oscillates. That is, in contrast with a reference or ideal state where the planetary pinion gears 123 and the ring gear 122 of the planetary gear unit 120 smoothly rotate at exactly the same speed, the rotation of the planetary pinion gears 123 in reality repeats acceleration and deceleration. At every speed change, gear teeth of the planetary pinion gears 123 strike gear teeth of the ring gear 122, producing backlash sounds.

In this embodiment, the target revolution speed Ne* of the engine 150 is increased to 1400 rpm at its peak within the range where the instruction torque value Tm2* of the electric motor MG2 is relatively small, that is, in an operating condition where the backlash sound is likely to occur. Since the energy Pe outputted from the engine 150 is not changed even if the revolution speed is increased, the target torque Te* is reduced in such a case. As a result, the torque fluctuation of the engine 150 is reduced so that the problem of backlash sound is reduced. Furthermore, since the revolution speed of the planetary pinion gears 123 relative to that of the ring gear 122 increases, gear teeth of the planetary pinion gears 123 are pressed against gear teeth of the ring gear 122, thereby substantially preventing occurrence of the backlash sound.

In the first embodiment, the output energy Pe of the engine 150 is not changed, but the target torque Te* is reduced corresponding to an increase in the target revolution speed Ne*. When the target revolution speed Ne* and the target torque Te* are changed, the EFECU 170 controls the opening and closing timing of the intake valve 150*a* using the VVT 153, and controls the opening of the throttle valve 166 by controlling the actuator 168, so as to adjust the revolution speed Ne and the torque Te of the engine 150 to a desired relationship.

Figure 13:
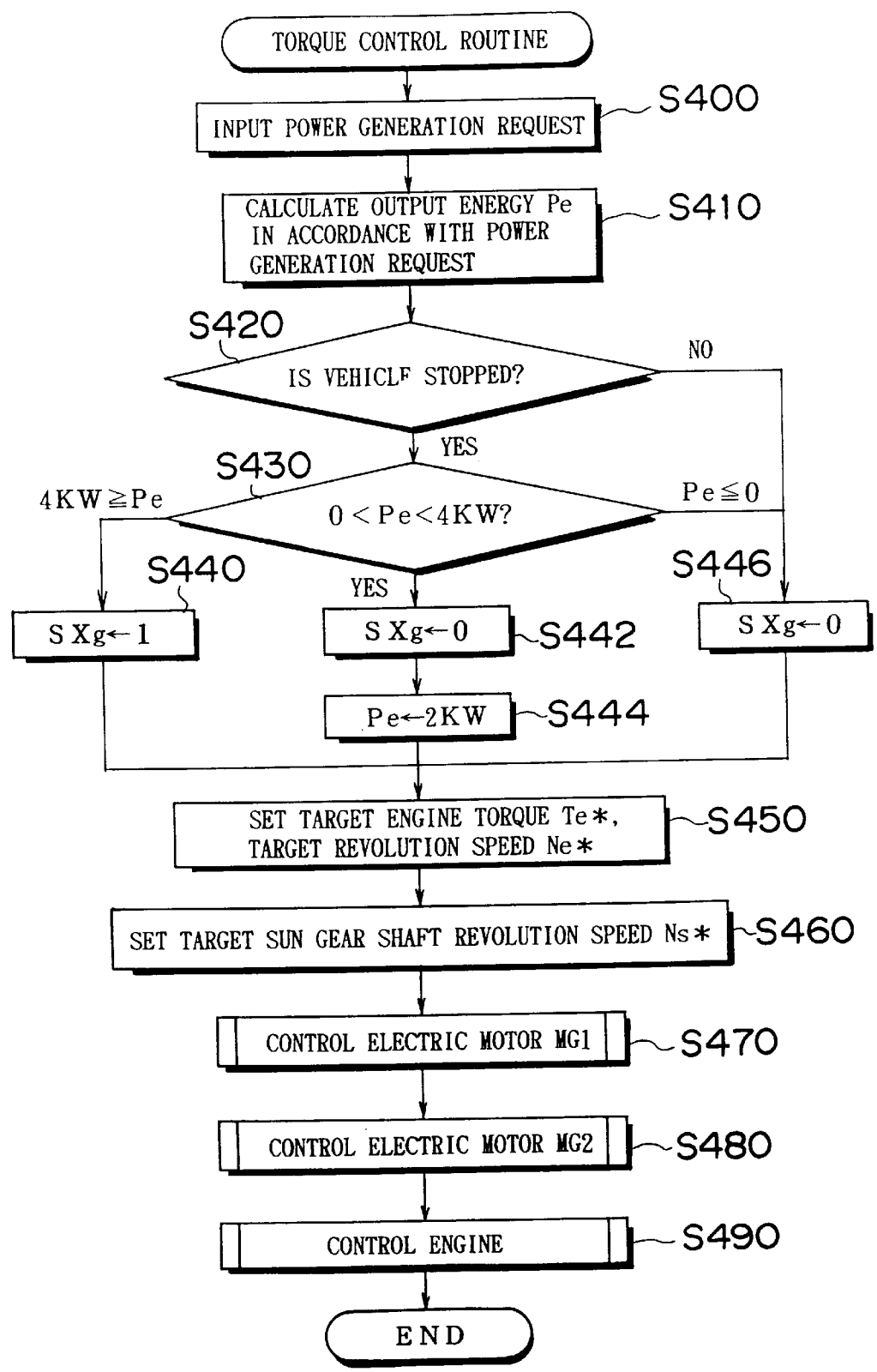
FIG. 13 is a flowchart illustrating a torque control routine for reducing the backlash sound according to a second embodiment.

A second embodiment of the invention will be described. A backlash sound reducing method according to the second embodiment reduces the backlash sound that occurs when the vehicle remains stopped. A control routine for this operation is illustrated in FIG. 13. When the torque control routine in FIG. 8 is started during a stop of the vehicle, a power generation request is inputted in step S400. Normally, the purpose in operating the engine 150 during a stop of the vehicle is to cause power generation and charge the battery 194, if not to operate an accessory or the like. During a stop, since the drive shaft 112 does not rotate, the electric motor MG1 is used for power generation. After a power generation request is determined taking into consideration the charged condition of the battery 194, the power consumption by accessories and the like is inputted, the control device 180 calculates an output energy Pe of the engine 150 in accordance with the power generation request in step S410.

Subsequently in step S420, it is checked whether the vehicle remains stopped. The check as to whether the vehicle remains stopped may be performed by detecting a revolution speed of the drive shaft 112, or detecting a shift position SP using the shift position sensor 184. If it is confirmed that the vehicle remains stopped, the control device 180 determines in step S430 whether the output energy Pe of the engine 150 calculated in step S410 is within the range of 0 to a predetermined value of the energy Pe (4 kW in this embodiment). If the output energy Pe of the engine 150 is equal to or greater than 4 kW, the control device 180 sets 1 to a flag SXg in step S440. Conversely, if the output energy Pe of the engine 150 is within the range (0 to 4 kW in this embodiment), the control device 180 resets the flag SXg to 0 in step S442, and sets the output energy Pe of the engine 150 to 2 kW in step S444.

If it is determined in step S420 that the vehicle is not stopped, or if it is determined in step S430 that the output energy Pe calculated is equal to or less than 0, the flag SXg is reset to 0 in step S446. After the output energy Pe of the engine 150 is determined and the flag SXg is set (steps S400–S446), the control CPU 190 sets a target torque Te* and a target revolution speed Ne* of the engine 150 based on the output energy Pe in step S450. The target torque Te* and the target revolution speed Ne* of the engine 150 are set so as to achieve a good operating efficiency of the engine 150 with the output energy Pe.

After a target revolution speed Ns* of the sun gear shaft 125 is set in step S460, the electric motor MG1 is controlled in step S470, as in the first embodiment. The revolution speed Ns of the sun gear shaft 125 is calculated by using equation (2).

In the routine according to the second embodiment, the electric motor MG2 is controlled in step S480, and the engine 150 is controlled in step S490. Since the revolution speed of the drive shaft 112 is 0 while the vehicle is stopped, the electric motor MG2 is controlled so that the electric motor MG2 will not rotate. Since the drive wheels 116, 118 are stopped naturally in contact with the ground, the drive shaft 112 will not rotate, that is, the electric motor MG2 remains still without a need to lock the electric motor MG2 by energization, as long as a force exerted on the drive shaft 112 to rotate by the torque Ter distributed to the sun gear shaft 125 from the torque Te of the engine 150 does not exceed the static friction force determined by the static friction coefficient. However, since there is a case where the vehicle is stopped on a road surface having a low friction coefficient, for example, an icy road surface, it is normally preferred that a steady current be supplied to the three-phase coils 144 of the electric motor MG2 to lock up the rotating shaft of the electric motor MG2. When the control to lock up the electric motor MG2 is performed in step S480, an external force exerted so as to rotate the rotor of the electric motor MG2 will be countered by a reaction torque produced in the electric motor MG2, so that the rotor will be fixed in position.

By executing the torque control as illustrated in FIG. 13, the output energy of the engine 150 is maintained if the vehicle is not stopped or if the energy Pe determined on the basis of the power generation request is out of the range of 0 to 4 kW although the vehicle is stopped. Conversely, if the vehicle is stopped and the calculated output energy Pe of the engine 150 is within the range of 0 to 4 kW, the output energy Pe of the engine 150 is set to 2 kW. The thus-set value of output energy Pe of the engine 150 is outputted from the control CPU 190 to the EFIECU 170, via the communication port. Therefore, the EFIECU 170 controls the opening of the throttle valve 166 of the engine 150, the fuel injection amount, the opening and closing timing of the intake valve 150a by using the VVT 153, and the like, so that the actual output energy of the engine 150 becomes equal to the set energy value.

Figure 14:
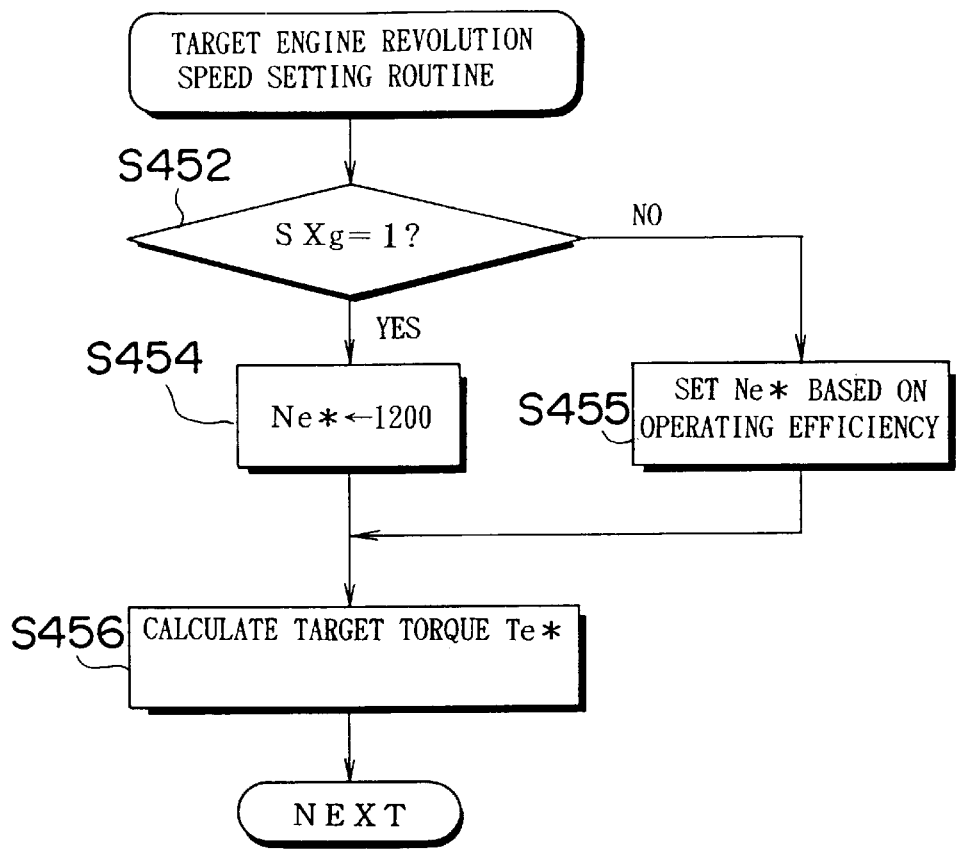
FIG. 14 is a flowchart illustrating a target engine revolution speed setting routine according to the second embodiment.

The backlash sound can be reduced merely by the operation illustrated in FIG. 13. However, the second embodiment also performs another operation to reduce the backlash sound, that is, the operation in step S450 of setting a target revolution speed Ne* of the engine 150. This operation is illustrated in detail in FIG. 14. When the operation in FIG. 14 is started, the value of the flag SXg is detected in step S452. If the value of the flag SXg is 1, the revolution speed Ne* of the engine 150 is set to a predetermined revolution speed (1200 rpm in this embodiment) that is higher than the normal revolution speed in step S454. If the value of the flag SXg is not 1, a revolution speed Ne* is determined in accordance with the conditions for high-efficiency operation of the engine 150 in step S455. After that, a target torque Te* of the engine 150 is determined in step S456, on the basis of the output energy Pe of the engine 150 and the target revolution speed Ne* determined in step S454 or S455. The target torque Te* can be determined by dividing the output energy Pe by the target revolution speed Ne*. By executing the operation illustrated in FIG. 14, an operating point of the engine 150 with a predetermined output energy Pe is set.

Figure 15:
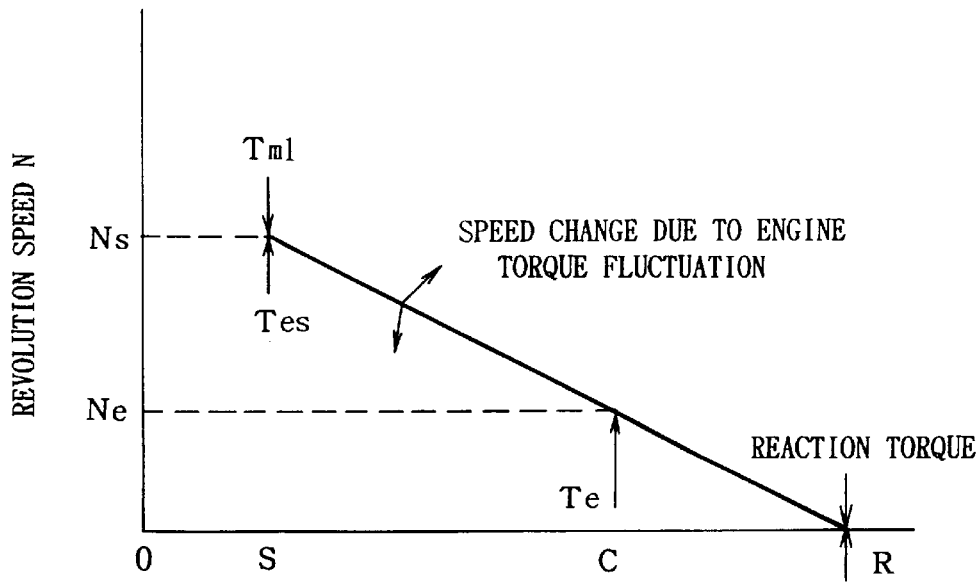
FIG. 15 is an alignment chart indicating an operation state of the planetary gear unit while the vehicle remains stopped.

By executing the operations illustrated in FIGS. 13 and 14, the backlash sound in the planetary gear unit 120 is considerably reduced. It will be described below how the backlash sound is reduced. First, the mechanism of production of a backlash sound while the vehicle is stopped will be described. In a case where the vehicle is at a stop and the engine 150 is operating, the ring gear shaft 126 of the planetary gear unit 120 is locked up by the electric motor MG2 so that the revolution speed of the ring gear shaft 126 always remains 0 as indicated in FIG. 15. A torque balance is established among the torque Te produced by the engine 150, the torque Tm1 from the electric motor MG1 applied to the sun gear shaft 125 and the reaction torque Tm2 from the electric motor MG2 applied to the ring gear shaft 126. Since the revolution speed of the ring gear shaft 126 is 0, fluctuations in the output torque Te of the engine 150 cause the operation alignment line to behave as if it oscillates with the position R of the ring gear shaft 126 being a fulcrum. If the revolution speed Ns of the sun gear shaft 125 is feedback-controlled to a target revolution speed Ns*, the torque Tm1 of the electric motor MG1 changes following the fluctuations in the output torque of the engine 150, so as to establish a balance. If the torque of the electric motor MG1 is varied exactly following the torque fluctuations of the engine 150, the operation alignment line will remain still. However, since the electric motor MG1 is controlled by feedback control, and since a delay inevitably occurs in control, it is impossible to eliminate the torque fluctuation of the engine 150 through the control of the electric motor MG1. Therefore, the operation alignment line inevitably oscillates. That is, in contrast with a reference or ideal state where the planetary pinion gears 123 and the sun gear 121 of the planetary gear unit 120 smoothly rotate at exactly the same speed, the rotation of the planetary pinion gears 123 in reality repeats acceleration and deceleration. At every speed change, gear teeth of the planetary pinion gears 123 strike gear teeth of the sun gear 121, producing backlash sounds.

Considering this mechanism of producing a backlash sound, it can be understood that a backlash sound is likely to occur if the torque fluctuation of the engine 150 is large. The torque fluctuation of the engine 150 is large if the output energy of the engine 150 is equal to or greater than 2 kW. In the second embodiment, if the vehicle is stopped and the engine 150 is being operated with an output energy of less than 4 kW, the output energy is limited to 2 kW by control. As a result, the engine 150 is operated within a range where the torque fluctuation is small. Therefore, the backlash sound is reduced. This operation corresponds to an internal combustion engine revolution speed control device for achieving a revolution speed equal to or higher than a predetermined value while changing the output energy of the internal combustion engine. Furthermore, the engine 150 in this embodiment is equipped with VVT 153. Using the VVT 153, this embodiment varies the opening and closing timing of the intake valve 150a so as to minimize the torque fluctuation while maintaining a constant output energy of the engine 150. This operation in the second embodiment also reduces the backlash sound.

If the output energy is equal to or greater than 4 kW, this embodiment reduces the backlash sound by increasing the revolution speed to 1200 rpm (step S454 in FIG. 14) without changing the output energy. If the output energy required for the engine 150 is greater than 4 kW, for example, for the purpose of charging the battery 194, it is not acceptable to reduce the output energy of the engine 150. In such a case, therefore, the required energy is maintained, but the revolution speed is increased. The increase of the revolution speed of the engine 150 achieves a state of the planetary gear unit 120 where the planetary pinion gears 123 rotate with gear teeth thereof being always in close or pressed contact with gear teeth of the sun gear 121, thereby reducing the backlash sound caused by impact between gear teeth.

Although a specific method for changing the output energy Pe of the engine 150 is not described above, the output energy of the engine 150 can easily be changed in the second embodiment since the throttle valve 166 for varying the amount of air taken into the engine 150 is driven by the actuator 168. In addition, in a case where the target revolution speed Ns* is changed so that the revolution speed of the sun gear shaft 125 is increased by the electric motor MG2 and, as a result, the revolution speed of the crankshaft 156 is increased, the second embodiment operates the throttle valve 166 in the closing direction to maintain a constant output energy of the engine 150.

When applied to a hybrid vehicle equipped with power output apparatus 110 incorporating the planetary gear unit 120, the second embodiment is able to reduce the backlash sound in the planetary gear unit 120 while the vehicle remains stopped.

Figure 17:
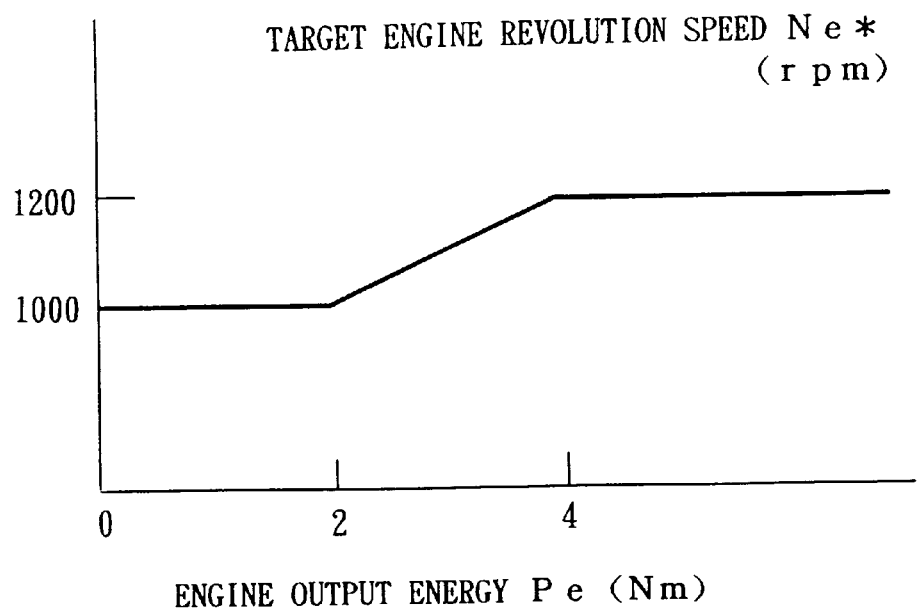
FIG. 17 is a graph indicating an example of the relationship between the engine output energy and the target engine revolution speed according to the third embodiment.
Figure 16:
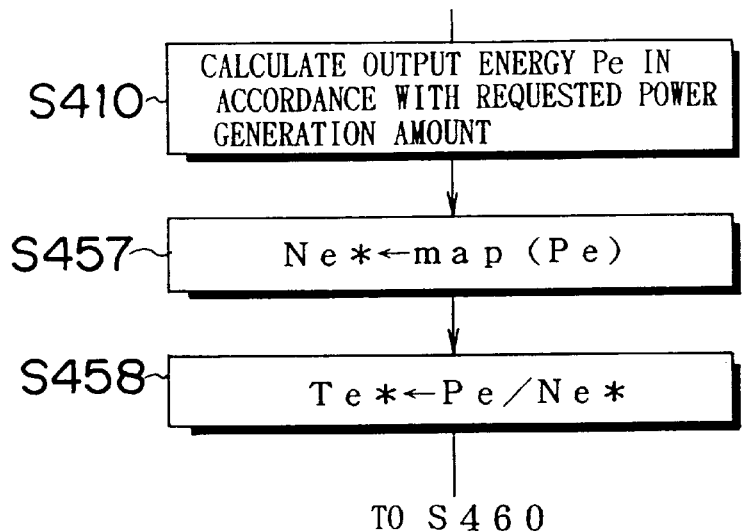
FIG. 16 is a flowchart illustrating an operation for reducing the backlash sound according to a third embodiment.

A third embodiment of the invention will be described. The third embodiment has substantially the same hardware construction as the second embodiment, and reduces the backlash sound while the vehicle remains stopped, as in the second embodiment. A torque control routine in the third embodiment is partially illustrated in FIG. 16. The torque control routine in the third embodiment is substantially the same as the control routine illustrated in FIG. 13, except that steps S420–S446 in FIG. 13 are omitted and the operation of step S450 of determining a target torque Te* and a target revolution speed Ne* of the engine is replaced by steps S457 and S458, as can be understood from the illustration of FIG. 16. After step S410 is executed, steps S457 and S458 are executed and immediately followed by steps S460–S490 in FIG. 13. In the torque control routine in the third embodiment, therefore, upon a power generation request, an output energy Pe of the engine 150 is calculated, and the output energy Pe of the engine 150 is not limited or changed afterwards. That is, after an output energy Pe of the engine 150 is calculated in accordance with the power generation request in step S410, a target revolution speed Ne* of the engine 150 is determined from a map pre-stored in the ROM 190b or the like in step S457, on the basis of the output energy Pe of the engine 150. An example of the map is indicated in FIG. 17. After that, a target torque Te* of the engine 150 is determined by dividing the output energy Pe of the engine 150 by the target revolution speed Ne* in step S458.

In the third embodiment as described above, the target revolution speed Ne* of the engine 150 is increased as the output energy Pe of the engine 150 increases within the range of 2 kW to 4 kW, as indicated in FIG. 17. Therefore, as the torque fluctuation increases, the revolution speed Ne* of the engine 150 is adjusted by control to increased revolution speeds, so that in the planetary gear unit 120, gear teeth of the planetary pinion gears 123 come into close or pressed mesh with teeth of the sun gear 121, thereby reducing the backlash sound.

Figure 18:
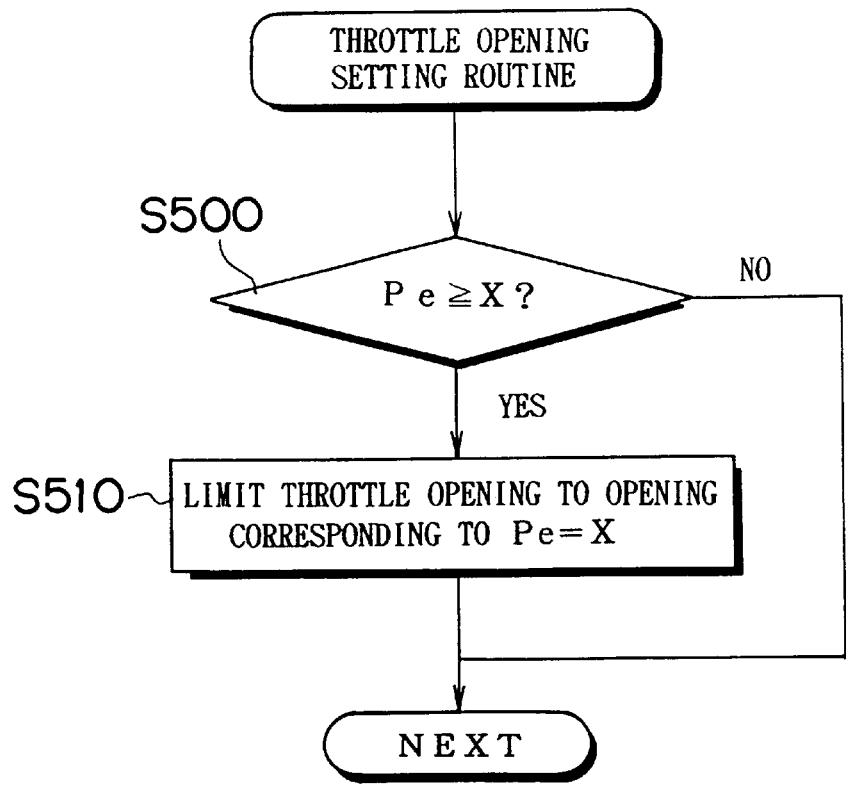
FIG. 18 is a flowchart illustrating a throttle opening setting routine for reducing the backlash sound according to a fourth embodiment.

A fourth embodiment of the invention will be described. The fourth embodiment also reduces the backlash sound while the vehicle remains stopped. However, the fourth embodiment does not limit the output energy of the engine 150 or increase the target revolution speed Ne* during the torque control routine. In this embodiment, an output energy Pe of the engine 150 is determined immediately from a request power generation amount, and a target revolution speed Ne* is determined without considering the backlash sound. In the fourth embodiment, upon receiving the output energy Pe of the engine 150 calculated and set by the control CPU 190, the EFIECU 170 performs a throttle opening setting routine as illustrated in FIG. 18. First, the EFIECU 170 determines in step S500 whether the output energy Pe from the control CPU 190 is equal to or greater than a predetermined value X. If the output energy Pe is equal to or greater than the predetermined value X, the EFECU 170 proceeds to S510, where the opening of the throttle valve 166 driven by the actuator 168 is limited to a value less than the value corresponding to the output energy Pe determined by the control CPU 190. The extent of limitation or reduction of the actual output energy of the engine 150 maybe determined on the basis of the range where the backlash sound is produced in the planetary gear unit 120.

By limiting the opening of the throttle valve 166 in this manner, this embodiment avoids operating the engine 150 in the range where the torque fluctuation of the engine 150 becomes large, thereby preventing the backlash sound. In this embodiment, the energy originally requested cannot be extracted from the engine 150 in the case as described above, so that the amount of power generation by the electric motor MG1 becomes less than the magnitude Pe set by the torque control routine. However, since the electric motor MG1 performs power generation, the battery 194 eventually becomes fully charged although the charging time becomes longer than that set by the control device 180.

The embodiments of the invention have been described in conjunction with the backlash sound reducing methods in the power output apparatus 110 for inputting and outputting power by using the planetary gear unit 120 to appropriately combine power from the engine 150, power from the electric motor MG1 and power from the electric motor MG2, the power output apparatus 110 employing the backlash sound reducing methods, and the hybrid vehicle equipped with the power output apparatus 110. However, since backlash sounds occur substantially in any manner of connection between the shafts of the planetary gear unit 120 and the engine 150, the electric motor MG1 and the electric motor MG2, the backlash sound reducing method of the invention may be applied to various power output apparatuses having different constructions.

Figure 19:
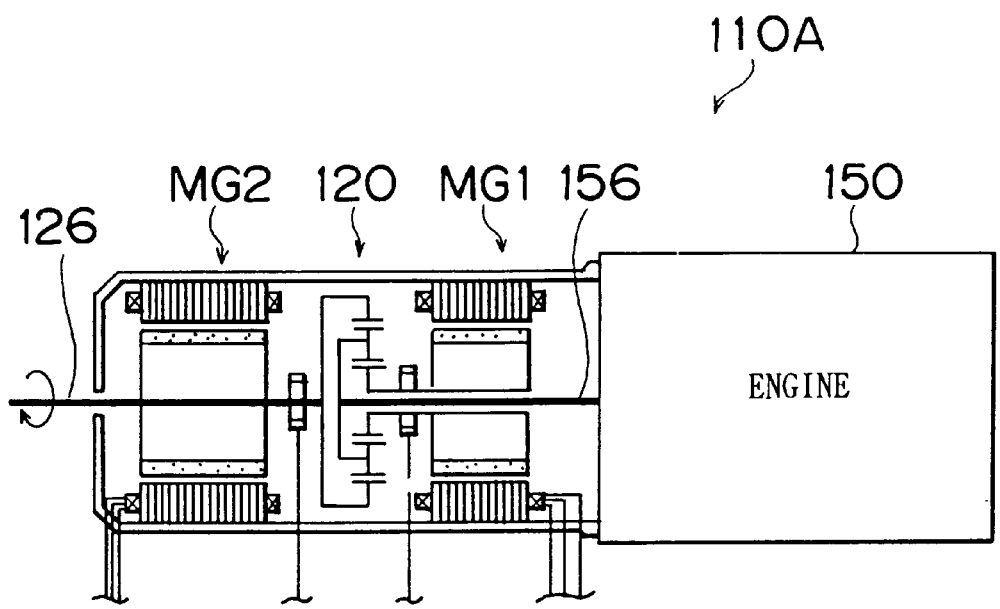
FIG. 19 is an illustration of another construction of the power output apparatus.

For example, although in the power output apparatus 110 in the foregoing embodiments, the power outputted to the ring gear shaft 126 is extracted via a gear disposed between the electric motor MG1 and the electric motor MG2, that is, the power output gear 128 connected to the ring gear 122, it is also possible to extract power via the case 115 to which an extension of the ring gear shaft 126 is connected as in a power output apparatus 110A according to a modification shown in FIG. 19. Furthermore, it is also possible to arrange the planetary gear unit 120, the electric motor MG2 and the electric motor MG1 in that order starting at the side of the engine 150. In these modifications, too, the problem of backlash sound occurs, so that the backlash sound reducing method is effective. Although not illustrated or described, other arrangements are also possible.

Figure 20:
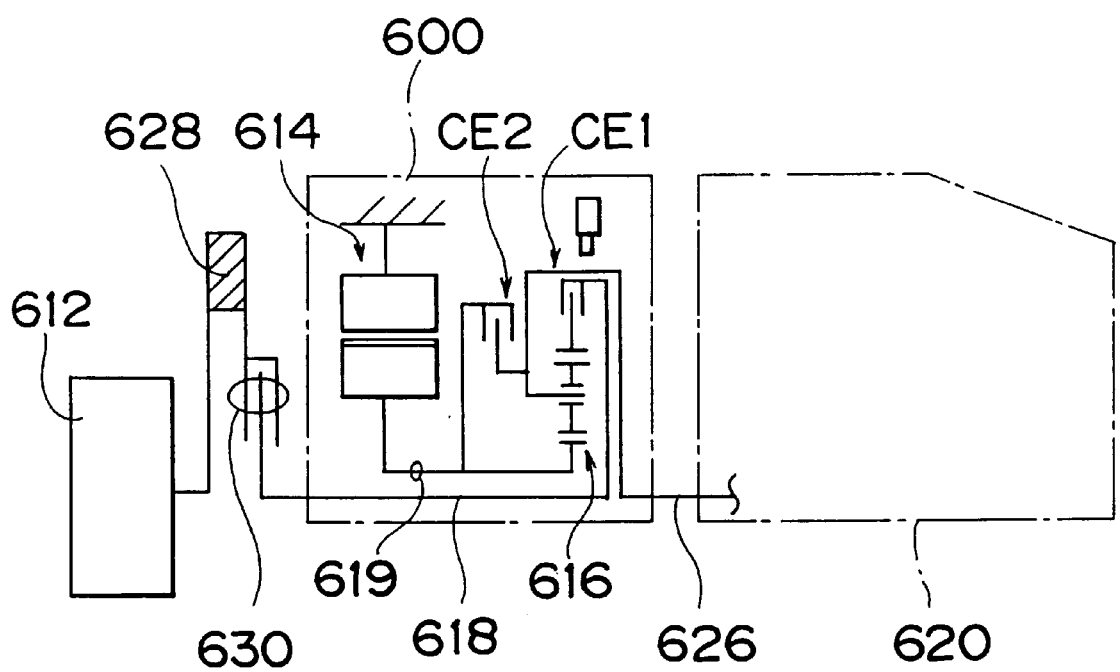
FIG. 20 is a schematic illustration of an electric torque converter according to a fifth embodiment of the invention.

A fifth embodiment of the invention will be described. The fifth embodiment reduces the backlash sound in electric torque converter 600. FIG. 20 is a schematic illustration of the construction of a power output apparatus 610 incorporating the electric torque converter 600 according to this embodiment. The power output apparatus 610 is connected to an engine 612 by a fly wheel 628 and a damper 630. An output shaft 626 of the electric torque converter 600 is connected to an automatic transmission 620 having an auxiliary transmission (not shown) as a first stage.

The electric torque converter 600 contains a motor-generator 614 capable of driving and generation, and a planetary gear unit 616 having a sun gear, a ring gear and planetary pinion gears. The sun gear of the planetary gear unit 616 has a hollow shaft through which an output shaft 618 connected to the damper 630 extends. The output shaft 618 is connectable to the ring gear of the planetary gear unit 616 by a first clutch CE1. A rotating shaft 619 is connected to the rotor of the motor-generator 614, and it is also connected to the sun gear of the planetary gear unit 616. The rotating shaft 619 is connectable to the planetary pinion gears of the planetary gear unit 616 by a second clutch CE2. The planetary pinion gears are connected to the output shaft 626 of the electric torque converter 600. In this embodiment, the gear ratio ρ of the planetary gear unit 616 is designed to about 0.5.

The basic operation of the electric torque converter 600 having the construction as described above will be described. First, the first clutch CE1 is engaged and the second clutch CE2 is disengaged. If in this state, the current through the three-phase coils of the motor-generator 614 is set to 0, power transmitted from the engine 612 to the ring gear of the planetary gear unit 616 does not revolve the planetary pinion gears since the power transmitted is not countered by any reaction force. Therefore, the output from the output shaft 626 becomes 0, so that the vehicle remains stopped. If the current through the coils of the motor-generator 614 is gradually increased from 0, the reaction force received by the sun gear from the motor-generator 614 gradually increases so that torque is gradually transmitted from the engine 612 to the output shaft 626. Based on the mechanical principle of the planetary gear unit 616, this embodiment, wherein the gear ratio ρ=0.5, is able to output a torque that is about 1.5 times the torque Te of the engine 612, from the planetary pinion gears to the output shaft 626 by the motor-generator 614 bearing a torque that is about half the engine torque Te. That is, the electric torque converter 600 is able to output (1+ρ) times the engine torque Te, at the maximum, in order to pull off the vehicle.

In the electric torque converter 600, if the output torque of the engine 612 fluctuates, impact between teeth of gears in the planetary gear unit 616 occurs at the time of acceleration and deceleration of the gear rotating speeds, thereby producing backlash sounds. Therefore, as in the first embodiment, the backlash sound in the planetary gear unit 616 can be reduced by reducing the output energy of the engine 612 or increasing the target revolution speed of the engine 612 if the output energy of the engine 612 is within a range where a backlash sound is likely to occur.

While the invention has been described with reference to what are presently considered to be preferred embodiments thereof, it is to be understood that the invention is not limited to the disclosed embodiments or constructions. To the contrary, the invention may be embodied in various manners without departing from the spirit of the invention. For example, although the foregoing embodiments perform various controls on assumption that the conditions for occurrence of a backlash sound are predetermined and that the backlash sound occurring conditions are established at the time of a predetermined revolution speed or a predetermined output energy, it is also possible to directly detect occurrence of a backlash sound by disposing in a vehicle an acoustic sensor for actually detecting a backlash sound. It is also possible to directly detect occurrence of a backlash sound by employing a vibration sensor provided in the planetary gear unit. Furthermore, considering that backlash sounds are likely to occur in a range where the engine torque fluctuation is large, it is also possible to detect a backlash sound occurring condition by directly or indirectly detecting an engine torque fluctuation.

What is claimed is:

1. A method for reducing a backlash sound that occurs in a gear mechanism having at least a first shaft, a second shaft and a third shaft, the first shaft being connected to an output shaft of an internal combustion engine provided as a power source, the second shaft being connected to a drive shaft as a load, the third shaft being connected to an electric motor, the method comprising:

detecting presence of a condition indicating occurrence of a backlash sound between gears of the gear mechanism; and setting torque transmitted between the gears to at least a predetermined value if the presence of the condition is detected.

2. A power output apparatus comprising:

an internal combustion engine provided as a power source and having an output shaft;

a gear mechanism having at least a first shaft, a second shaft and a third shaft, the first shaft being connected to the output shaft of the internal combustion engine;

a drive shaft connected to the second shaft;

an electric motor connected to the third shaft;

a backlash sound condition detector that detects a condition indicating occurrence of a backlash sound between gears of the gear mechanism; and an internal combustion engine revolution speed controller that controls a revolution speed of the internal combustion engine so that the revolution speed becomes equal to or greater than a predetermined value if the condition indicating occurrence of a backlash sound is detected.

3. The power output apparatus according to claim 2, further comprising a drive shaft output controller that cancels out a change in an output state of the drive shaft caused by a change in the revolution speed if the revolution speed of the internal combustion engine is changed by the internal combustion engine revolution speed controller.

4. The power output apparatus according to claim 2, wherein the gear mechanism is a planetary gear unit, the electric motor is a first electric motor, a second electric motor is connected to the drive shaft, and the internal combustion engine revolution speed controller controls the revolution speed by controlling the first electric motor and the second electric motor so that the revolution speed is equal to or greater than the predetermined value without changing an output energy of the internal combustion engine.

5. The power output apparatus according to claim 2, further comprising an internal combustion engine operation controller that varies an energy outputted by the internal combustion engine, wherein the gear mechanism is a planetary gear unit, the electric motor is a first electric motor, a second electric motor is connected to the drive shaft, and the internal combustion engine revolution speed controller controls the revolution speed by controlling the first electric motor, the second electric motor and the internal combustion engine operation controller so that the revolution speed is equal to or greater than the predetermined value while changing an output energy of the internal combustion engine.

6. The power output apparatus according to claim 2, wherein the condition detected by the backlash sound condition detector is an operation state of the power output apparatus within a predetermined operation range.

7. The power output apparatus according to claim 2, wherein the backlash sound condition detector detects the condition if an output torque of the electric motor is equal to or less than a first predetermined value and a fluctuation of an output torque of the internal combustion engine is equal to or greater than a second predetermined value.

8. The power output apparatus according to claim 2, wherein the backlash sound condition detector detects a predetermined period following a start of the internal combustion engine as a backlash sound occurrence period.

9. The power output apparatus according to claim 2, further comprising a braking force adjuster that adjusts a braking force applied from the electric motor to the third shaft, wherein the gear mechanism is a planetary gear unit, and a torque outputted from the output shaft of the internal combustion engine to the drive shaft is converted by adjusting the braking force with the braking force adjuster.

10. A hybrid vehicle, comprising:

the power output apparatus according to claim 2;

a secondary battery that stores an electric energy regenerated by the electric motor and outputs the electric energy to the electric motor when necessary;

an internal combustion engine operation controller that varies an energy outputted by the internal combustion engine;

a target power setter that sets a target power to be outputted by the internal combustion engine; and a power controller that controls a power outputted to the drive shaft so that the power outputted to the drive shaft is substantially equal to the target power by controlling the internal combustion engine operation controller and an electric power exchange between the electric motor and the secondary battery.

11. A power output apparatus comprising:

an internal combustion engine provided as a power source and having an output shaft;

a gear mechanism having at least a first shaft, a second shaft and a third shaft, the first shaft being connected to the output shaft of the internal combustion engine;

a drive shaft connected to the second shaft;

an electric motor connected to the third shaft;

a backlash sound condition detector that detects a condition indicating occurrence of a backlash sound between gears of the gear mechanism; and an internal combustion engine torque controller that controls an output torque of the internal combustion engine so that the output torque becomes equal to or less than a predetermined value if the condition indicating occurrence of a backlash sound is detected.

12. The power output apparatus according to claim 11, further comprising a drive shaft output controller that cancels out a change in an output state of the drive shaft caused by a change in the torque if the torque of the internal combustion engine is changed by control by the internal combustion engine torque controller.

13. The power output apparatus according to claim 11, wherein the gear mechanism is a planetary gear unit, the electric motor is a first electric motor, a second electric motor is connected to the drive shaft, and the internal combustion engine torque controller controls the output torque by controlling the first electric motor and the second electric motor so that the output torque is equal to or less than the predetermined value without changing an output energy of the internal combustion engine.

14. The power output apparatus according to claim 11, further comprising an internal combustion engine operation controller that varies an energy outputted by the internal combustion engine, wherein the gear mechanism is a planetary gear unit, the electric motor is a first electric motor, a second electric motor is connected to the drive shaft, and the internal combustion engine torque controller controls the output torque by controlling the first electric motor, the second electric motor and the internal combustion engine operation controller so that the output torque is equal to or less than the predetermined value while changing an output energy of the internal combustion engine.

15. The power output apparatus according to claim 11, wherein the condition detected by the backlash sound condition detector is an operation state of the power output apparatus within a predetermined operation range.

16. The power output apparatus according to claim 11, wherein the backlash sound condition detector detects the condition if an output torque of the electric motor is equal to or less than a first predetermined value and a fluctuation of the output torque of the internal combustion engine is equal to or greater than a second predetermined value.

17. The power output apparatus according to claim 11, wherein the backlash sound condition detector detects a predetermined period following a start of the internal combustion engine as a backlash sound occurrence period.

18. The power output apparatus according to claim 11, further comprising a braking force adjuster that adjusts a braking force applied from the electric motor to the third shaft, wherein the gear mechanism is a planetary gear unit, and a torque outputted from the output shaft of the internal combustion engine to the drive shaft is converted by adjusting the braking force with the braking force adjuster.

19. A hybrid vehicle, comprising:

the power output apparatus according to claim 11;

a secondary battery that stores an electric energy regenerated by the electric motor and outputs the electric energy to the electric motor when necessary;

an internal combustion engine operation controller that varies an energy outputted by the internal combustion engine;

a target power setter that sets a target power to be outputted by the internal combustion engine; and a power controller that controls a power outputted to the drive shaft so that the power outputted to the drive shaft is substantially equal to the target power by controlling the internal combustion engine operation controller and an electric power exchange between the electric motor and the secondary battery.

* * * * *